US006075564A

United States Patent [19]

Mizuno

[11] Patent Number: 6,075,564

[45] Date of Patent: Jun. 13, 2000

[54] SOLID-STATE IMAGING APPARATUS

[75] Inventor: Seiichiro Mizuno, Hamamatsu, Japan

[73] Assignee: Hamamatsu Photonics K.K., Hamamatsu, Japan

[21] Appl. No.: 08/831,745

[22] Filed: Apr. 1, 1997

[30] Foreign Application Priority Data

Apr. 1, 1996 [JP] Japan .................................... 8-079088

[51] Int. Cl.[7] ..................................................... H04N 5/335

[52] U.S. Cl. ........................... 348/294; 348/241; 348/250

[58] Field of Search .................................... 348/294, 241, 348/250

[56] References Cited

PUBLICATIONS

Hoe et al.; An Auto–Ranging Photodiode Preamplifier with 114 DB Dynamic Range, IEEE Journal on Solid–State Circuits, pp. 187–194, Feb. 1996.

Garverick et al., "A 43–Channel IC for Programmable, Nonlinear Quantization of Multichannel Detector Data", IEEE Journal of Solid–State Circuits, vol. 30, No. 5, May 1995, pp. 4 533–541.

*Primary Examiner*—Wendy Garber
*Assistant Examiner*—Andrew B. Christensen
*Attorney, Agent, or Firm*—Pillsbury Madison & Sutro LLP

[57] ABSTRACT

An analog voltage signal corresponding to a light intensity received by a photosensitive pixel is sampled. At the time when thus sampled analog voltage signal is inputted into a clamping circuit, a comparative voltage signal changing over time is coupled therewith by means of capacitive coupling. In a comparator circuit, the voltage level of the output signal from the clamping circuit is compared with the reference voltage level, while being changed. Then, the counter digital signal at the moment when the comparison result signal changes is latched in a holding circuit. Thus, imaging is executed accurately at a high speed.

23 Claims, 17 Drawing Sheets

KS
CP
VSi
i=1
i=2
VSO
SP
VCO
-VR
(-VO)
+VR
(+VO)
VCM
DC
DC(t)
DLj
DLj
HSj
j=1
j=2
VO
DL1
DL2

DL
D
T
260
Dc
VCM
CMP
250
VCO
244
243
242
CLP
240
VR
241
245
VCi
SMP
230
VSO
220
222
221
KRS
223
Vref
210
140
130
120
100A
400
Dc
VR
300A
CMP
CLP
SMP
KRS
VS DL
D
T
260
Dc
VCM
CMP
250
VCO
244
243
242
CLP
240
VR
241
245
VCi
SMP
230
VSO
220
222
221
KRS
223
Vref
210
120M
100B
140
130
1201
400
Dc
VR
300B
CMP
CLP
SMP
KRS
VSM
VS1

Do
HS1
HSN
270
2711
271N
DL1
DLN

D T
260
Dc
VCM
CMP
250
VCO
400
244
243
242
240
CLP
VR
241
245
VCi
210N
SMP
230
VSO
220
223
222
221
KRS
Vref
2101
300D
1101
120M,N
120M,1
140
110N
130
1201,N
1201,1
100D
HSN
HS1
VSM
VS1
N
M
1

SOLID-STATE IMAGING APPARATUS

BACKGROUND OF THE INVENTION

1. Field of the Invention

The present invention relates to a solid-state imaging apparatus for capturing an inputted light image.

2. Related Background Art

Imaging apparatuses using solid-state imaging devices such as charge coupled device (CCD) have been widely used in various fields such as home video. When charges of a large photodiode are to be handled, however, they may not be completely transferred by a CCD due to its low charge transfer efficiency. Therefore, of solid-state imaging apparatuses, MOS imaging sensors, which do not cause any problem in terms of charge transfer efficiency, are used in specific fields.

As the final data format of the results of imaging obtained by such an imaging sensor, a digital format is often desired. Also, in order to improve the reproduced image quality, the number of bits representing the received light intensity at the time of digital conversion should be as large as possible.

A conventional image sensor combines vertical and horizontal scanning operations so as to successively read out analog signals such as voltage level from respective pixels, while obtaining digital data each time one analog-to-digital converter performs conversion.

In order for the images captured by a large number of pixels to be processed at a high speed, it is necessary for each pixel to be subjected to a shorter time of analog-to-digital conversion. In a short time of conversion, however, it is hard to attain highly accurate digitization.

Therefore, attention has been paid to a technique in which analog-to-digital converters are provided for respective horizontal lines so that the analog-to-digital converting operation is paralleled, whereby each analog-to-digital converter can secure a sufficient time for conversion and naturally attains highly accurate digitization.

Also, in that a photosensitive section and a signal-processing section are implemented in a single tip, which is hard to realize in a CCD, the superiority of MOS image sensor has been coming to the fore.

Under these circumstances, a solid-state imaging apparatus in which analog-to-digital converters are provided for respective horizontal lines (referred to as "prior art" hereinafter") is proposed in S. L. Garverick et al., *IEEE Journal of Solid-State Circuit,* Vol. 30, No. 5, May 1995, pp. 533–541.

FIG. 1 is a schematic view showing the circuit configuration of the solid-state imaging apparatus in the prior art. As depicted, this apparatus comprises a photosensitive section 910 provided with N pieces of vertical photosensitive sections $\mathbf{911}_j$ (j=1 to N) aligned in a first direction (referred to as "horizontal direction" hereinafter). Each photosensitive section $\mathbf{911}_j$ comprises M pieces of photosensitive pixels $\mathbf{912}_{i,j}$ (i=1 to M) aligned in a second direction (referred to as "vertical direction" hereinafter). Each photosensitive pixel $\mathbf{912}_{i,j}$ comprises a photodiode 913 for converting an input optical signal into a current signal and a switch 914 having a first terminal connected to a signal output terminal of the photodiode 913 and a second terminal for outputting the current signal generated in the photodiode 913. The switch 914 opens and closes according to the level of received vertical scanning signal VSi. The switches 914 in the respective photosensitive pixels $\mathbf{912}_{i0,j}$ horizontally aligned at the same position (i=i0) with respect to the vertical direction simultaneously open and close according to a common vertical scanning signal $VS_{i0}$, whereas the switches 914 in the respective photosensitive pixels $\mathbf{912}_{i,j0}$ vertically aligned at the same position (j=j0) with respect to the horizontal direction open and close according to vertical scanning signals VSi different from each other. The apparatus also comprises N pieces of signal-converting circuits $\mathbf{915}_j$ respectively provided for the vertical photosensitive sections $\mathbf{911}_j$. Each signal-converting circuits $\mathbf{915}_j$ outputs a digital signal DLj corresponding to the amount of charge flowing therein due to the received current signal. The apparatus further comprises an output-selecting circuit 970 for receiving the digital signals DLj outputted from the signal-converting circuits $\mathbf{915}_j$ and outputting the digital signal DLj outputted from the signal-converting circuit $\mathbf{915}_j$ designated by a horizontal scanning signal HSj; a timing control section 980 for outputting the vertical scanning signal VSi, a reset instruction signal KS, a sampling instruction signal SP, a clamping instruction signal CP, and the horizontal scanning signal HSj; and a comparison control section 990 for outputting a digital counter signal $D_C$ with a predetermined period in which the digital value carried thereby changes and comparative voltage signals $+V_R$ and $-V_R$ whose voltage levels change over a predetermined duration.

The signal-converting circuit $\mathbf{915}_j$ comprises an integrating circuit 920 which selectively performs a time quadrature operation of the current signal received from the vertical photosensitive section $\mathbf{911}_j$ and an initializing operation for the time quadrature operation and output signal so as to output a voltage signal $V_{SO}$ which selectively corresponds to the voltage signal of the result of time quadrature of the current signal and the initial level of voltage signal with reference to time. The integrating circuit 920 selectively performs the time quadrature operation of the current signal and the initializing operation for the time quadrature operation and output signal according to the level of the received reset instruction signal KS. The signal-converting circuit $\mathbf{915}_j$ also comprises a clamping circuit 930 for receiving the voltage signal $V_{SO}$ outputted from the integrating circuit 920 and executing a clamping operation in response to the clamping instruction signal CP; a sample-and-hold circuit 940 which receives a voltage signal $V_{CO}$ outputted from the clamping circuit 930, performs a sampling-and-holding operation in response to the sampling instruction signal SP, receives the comparative voltage signals $+V_R$ and $-V_R$, and outputs a voltage signal corresponding to the sum of the levels of the voltage signal $V_{CO}$ and comparative voltage signal $+V_R$ and a voltage signal corresponding to the sum of the levels of the voltage signal $V_{CO}$ and comparative voltage signal $-V_R$; a comparator circuit 950 for receiving two signals outputted from the sample-and-hold circuit 940 and comparing the voltages of two signals with each other; and a latch circuit 960 which receives a comparison result signal outputted from the comparator circuit 950, receives the digital counter signal $D_C$, and latches the value of the digital counter signal $D_C$ at a moment when the comparison result signal changes in a predetermined manner.

This apparatus reads out, as digital data, captured data of a light image formed by light incident on the photosensitive section 910 as explained in the following. FIG. 2 is a timing chart showing operations of this apparatus.

First, before executing a readout operation, the timing control section 980 sets the reset instruction signal KS to its logical true level so as to set the output of the integrating circuit 920 to a reference voltage $V_{ref}$ which is its initial level, while setting the clamping instruction signal CP to a logical true level so as to set the input/output voltage of the clamping circuit 930 to the reference voltage $V_{ref}$ which is its initial level.

Also, the comparison control section 990 outputs the comparative voltage signals $+V_R=V_0$ and $-V_R=-V_0$ ($V_0>0$) which are initial comparative voltages.

Then, after setting the reset instruction signal KS and the clamping instruction signal CP to their logical false levels, the timing control section 980 sets a vertical scanning signal VS1, which turns on only the switch 914 of the first photosensitive pixel $\mathbf{912}_{1,j}$ in the vertical scanning operation for each vertical photosensitive section $\mathbf{911}_j$, to its logical true level and outputs this signal. When the switch 914 is turned on, the charge accumulated in the photodiode 913 in response to the light received so far is outputted from the photosensitive section 910 as a current signal. Then, thus outputted current signal is accumulated by the integrating circuit 920 at its feedback capacitor and then is outputted therefrom as a voltage. The signal $V_{SO}$ outputted from the integrating circuit 920 is inputted into the sample-and-hold circuit 940 as the signal $V_{CO}$ by way of the clamping circuit 930.

The sample-and-hold circuit 940 receives the comparative voltage signals $+V_R$ and $-V_R$ and the signal $V_{CO}$ and outputs a sample signal S1, which is determined by the voltage level of the comparative voltage signal $+V_R$ and the voltage level of the signal $V_{CO}$, and a sample signal S2, which is determined by the comparative voltage signal $-V_R$ and the voltage level of the signal $V_{CO}$. Also, in cases where the sampling instruction signal SP becomes an logical false level, the sample-and-hold circuit 940 outputs the sample signals S1 and S2 at the moment when the sampling instruction signal SP has become logical false.

From the moment at which the sampling instruction signal has changed from the logical true level to the logical false level after sampling, the comparison control section 990 successively lowers the voltage level of the reference voltage signal $+V_R$ with a constant gradient, while successively increasing the voltage level of the comparative voltage signal $-V_R$ with a gradient having the same absolute value as the gradient of the comparative voltage signal $+V_R$. As a result, the voltage level of the sample signal S1 successively decreases, while the voltage level of the sample signal S2 successively decreases.

Also, from the moment at which the sampling instruction signal SP has changed from the logical true level to the logical false level after sampling, the comparison control section 990 starts counting by means of a counter with a clock having a predetermined period and outputs the counted value as the digital counter signal $D_C$.

The sample signals S1 and S2 outputted from the sample-and-hold circuit 940 are inputted into the comparator circuit 950, where their voltage levels are compared with each other. As mentioned earlier, the voltage of the sample signal S1 is higher than that of the sample signal S2 immediately after the shift from a sampling state to a holding state. As the voltage level of the comparative voltage signal $+V_R$ successively decreases and the voltage level of the comparative voltage signal $-V_R$ successively increases, the voltage level of the sample signal S1 coincides with that of the sample signal S2 at a certain moment. Thereafter, the voltage level of the sample signal S1 becomes lower than that of the sample signal S2. As a result, in the output of the comparator circuit 950, a comparison result signal $V_{CM}$ changes between before and after the moment at which the voltage level of the sample signal S1 coincides with that of the sample signal S2.

The latch circuit 960 receives the comparison result signal $V_{CM}$, latches the level of the digital counter signal $D_C$ at the moment when the comparison result signal $V_{CM}$ changes, and outputs thus latched level.

Then, according to the setting of the horizontal scanning signal HSj, a readout operation for data concerning the first photosensitive pixels $\mathbf{912}_{1,j}$ in the vertical direction is started.

The timing control section 980 sets a horizontal scanning signal HS1, which instructs only a switch $\mathbf{971}_1$ corresponding to the first photosensitive pixel $\mathbf{912}_{1,1}$ in the horizontal direction to be selected, to its logical true level, thereby turning on only the switch $\mathbf{971}_1$ corresponding to the first photosensitive pixel $\mathbf{912}_{1,1}$.

Then, the digital signal transmitted through the switch $\mathbf{971}_1$ is outputted as an output data signal $V_0$ corresponding to the light intensity incident on the first photosensitive pixel $\mathbf{912}_{1,1}$ in the horizontal direction.

Subsequently, the horizontal scanning signal HS1, which instructs only the switch $\mathbf{971}_1$ corresponding to the first photosensitive pixel $\mathbf{912}_{1,1}$ in the horizontal direction to be selected, is set to its logical false level, thereby terminating a readout operation for the first photosensitive pixel $\mathbf{912}_{1,1}$ in the horizontal direction.

Then, as with the first photosensitive pixel $\mathbf{912}_{1,1}$ in the horizontal direction, data readout operations for the second and later photosensitive pixels $\mathbf{912}_{1,j}$ in the horizontal direction are performed.

Thereafter, the timing control section 980 sets the reset instruction signal KS and camping instruction signal CP to their logical true levels, while the comparison control section 990 sets the comparative voltage signals to their initial voltage levels, thereby executing data readout operations for the second and later photosensitive pixels $\mathbf{912}_{i,j}$ in the vertical scanning operation of each vertical photosensitive section $\mathbf{911}_j$.

SUMMARY OF THE INVENTION

In view of the foregoing, it is an object of the present invention to provide a solid-state imaging apparatus which enables highly accurate imaging.

The solid-state imaging apparatus of the present invention comprises a photosensitive section provided with at least one photosensitive pixel, which comprises a photodiode for converting an input optical signal into a current signal and a first switch having a first terminal connected to a signal output terminal of the photodiode and a second terminal for outputting the current signal generated in the photodiode, the first switch opening and closing according to the level of a charge readout instruction signal; a signal-converting circuit which is provided for each current signal outputted from the photosensitive section and outputs a digital signal corresponding to the amount of charge flowing therein due to the received current signal; a timing control section for outputting a charge readout instruction signal, a reset instruction signal, a sampling instruction signal, and a clamping instruction signal; and a comparison control section for outputting a digital counter signal with a predetermined period in which the digital value carried thereby changes and a comparative voltage signal whose voltage level changes over a predetermined duration.

The signal-converting circuit comprises an integrating circuit which selectively performs a time quadrature operation of the current signal received from the photosensitive section and an initializing operation for the time quadrature operation and output signal so as to output a first voltage signal which selectively corresponds to the voltage signal of the result of time quadrature of the current signal and the initial level of voltage signal with reference to time, the integrating circuit selectively executing the time quadrature operation of the current signal and the initializing operation for the time quadrature operation and output signal according to the level of the received reset instruction signal; a second switch which has a first terminal for receiving the first voltage signal outputted from the integrating circuit and a second terminal for outputting the first voltage signal and opens and closes according to the level of the sampling instruction signal; a clamping circuit for receiving the first voltage signal transmitted through the second switch and a comparative voltage signal, selectively executing a clamping operation and an operation for generating a voltage level corresponding to the voltage levels of the first voltage signal and comparative voltage signal, and outputting a second voltage signal which selectively corresponds to the voltage level at the clamping operation and the voltage level corresponding to the voltage levels of the first voltage signal and comparative voltage signal with reference to time, the clamping circuit selectively executing the clamping operation and the generating operation according to the level of the received clamping instruction signal; a comparator circuit for receiving the second voltage signal outputted from the clamping circuit, comparing the voltage levels of the second voltage signal and a first reference voltage in terms of magnitude, and outputting a comparison result signal corresponding to the result of comparison; and a data holding circuit for receiving the digital counter signal and the comparison result signal, holding the digital counter signal at a moment when the comparison result signal changes in a predetermined manner, and outputting thus held signal.

Here, the integrating circuit is preferably realized by a configuration which comprises a differential amplifier having a negative input terminal connected to the second terminal of the first switch and a positive input terminal set to a second reference voltage; a capacitor having a first terminal connected to the negative input terminal of the differential amplifier and a second terminal connected to the output of the differential amplifier; and a third switch which has a first terminal connected to the negative input terminal of the differential amplifier and a second terminal connected to the output of the differential amplifier and opens and closes according to the level of the reset instruction signal.

Also, the clamping circuit is preferably realized by a configuration comprising a first capacitor which has a first terminal for receiving the first voltage signal from the integrating circuit; a differential amplifier having a negative input terminal connected to a second terminal of the first capacitor and a positive input terminal set to the second reference voltage; a second capacitor having a first terminal connected to the negative input terminal of the differential amplifier and a second terminal connected to the output of the differential amplifier; a third switch which has a first terminal connected to the negative input terminal of the differential amplifier and a second terminal connected to the output of the differential amplifier and opens and closes according to the level of the reset instruction signal; and a third capacitor having a first terminal connected to the negative input terminal of the differential amplifier and a second terminal for receiving the comparative voltage signal.

Also, the change in the voltage level of the comparative voltage signal can be made substantially linear over time.

In the solid-state imaging apparatus of the present invention, a light image formed by light incident on the photosensitive section is inputted, and a charge corresponding to the received light intensity is accumulated in the photodiode in the photosensitive section. Then, after the lapse of a predetermined detecting period, digital data corresponding to the amount of charge accumulated in the respective photosensitive pixels are read out as follows.

First, before executing a readout operation, the timing control section sets the reset instruction signal to its logical true level so as to set the output of the integrating circuit to a reference voltage which is its initial level, while setting the clamping instruction signal to its logical true level so as to set the input/output voltage of the clamping circuit to its initial level. Also, the comparison control section sets the comparative voltage signal to the initial comparative voltage level.

Then, after setting the reset instruction signal and clamping instruction signal to their logical false levels, the timing control section sets and outputs a charge readout instruction signal which turns on only the first switch in the first photosensitive pixel group to be read out. When the first switch is turned on, the charge accumulated in the photodiode due to the light received so far is outputted from the photosensitive section as a current signal, which is then received by the signal-converting circuit. The current signal received by the signal-converting circuit is accumulated in the integrating circuit at its feedback capacitor and then is outputted therefrom as a voltage. The signal outputted from the integrating circuit is received by the clamping circuit by way of the second switch.

After the lapse of a predetermined time since only the first switch of the photosensitive pixel group to be read out is turned on, the timing control section sets the sampling instruction signal to its logical false level, thereby turning off the second switch. After the second switch is turned off, the input terminal of the clamping circuit is held at the voltage level at the moment when the second switch is turned off.

In this case, regardless of the operating speed of the whole apparatus, the charge-accumulating capacitor in the clamping circuit can have a larger capacity level, whereby kTC noise, which is inversely proportional to the capacity level, can be sufficiently reduced.

Also, it is not always necessary for a high-performance operational amplifier or the like to be used in the first stage of the clamping circuit, whereby the power consumption is prevented from increasing.

After the sampling instruction signal changes from the logical true level to the logical false level, the comparison control section successively changes the voltage level of the comparative voltage signal, for example, with a constant gradient. As a result, the voltage level of the signal outputted from the clamping circuit changes.

Also, as the voltage level of the comparative voltage signal begins to decrease, the comparison control section starts counting by means of a counter with a clock having a predetermined period and outputs the counted value as the digital counter signal.

The voltage signal outputted from the clamping circuit is inputted into the comparator circuit, where the level of thus inputted voltage signal is compared with the reference voltage level.

As the comparative voltage signal changes, the voltage of the signal outputted from the clamping circuit coincides with the reference voltage of the comparator circuit at a certain moment. As a result, the comparison result signal changes between before and after the moment when the voltage of the signal outputted from the clamping circuit coincides with the reference voltage.

The data holding circuit receives the comparison result signal, holds the level of the digital counter signal at the moment when the comparison result signal changes, and outputs thus held level.

Consequently, the result of imaging can be read out as digital data accurately at a high speed.

When the change in the voltage level of the comparative voltage signal is substantially linear over time in the solid-state imaging apparatus of the present invention, it is unnecessary for a large-size MOS transistor to be used in the clamping circuit in which the comparative voltage signal is inputted. Accordingly, even when the input capacity of the comparative voltage signal and the input capacity of the clamping circuit are connected in series to each other, the voltage of the output signal of the clamping circuit linearly changes, following the linear change in the voltage of the comparative voltage signal. Accordingly, the value obtained after analog-to-digital conversion and the output voltage level $V_{CO}$ of the clamping circuit to be converted can be measured with a favorable linearity.

The solid-state imaging apparatus of the present invention may be configured such that the photosensitive section is provided with a first number, which is more than one, of photosensitive pixels each comprising a photodiode for converting an input optical signal into a current signal and a first switch having a first terminal connected to a signal output terminal of the photodiode and a second terminal for outputting the current signal generated in the photodiode, each of the first switches opening and closing according to the level of a corresponding charge readout instruction signal, the second terminals of the first switch being connected each other.

Here, the first number of photosensitive pixels may be aligned along a first direction. In this case, a linear image sensor is formed.

In such a solid-state imaging apparatus, first, the timing control section selects a first photosensitive pixel in the photosensitive section and digital data corresponding to the light intensities received by the photodiodes of the photosensitive pixel are outputted from the signal-converting circuit as mentioned earlier.

Then the timing control section sets the reset instruction signal and the clamping instruction signal to their logical true levels, while the comparison control section sets the comparative voltage signal to the initial comparative voltage level, thereby executing data readout operations concerning the second and later photosensitive pixels of the photosensitive section.

As a result, the result of imaging can be read out as digital data accurately at a high speed.

The solid-state imaging apparatus of the present invention may be configured such that (i) the photosensitive section is provided with a first number, which is more than one, of photosensitive pixels each comprising a photodiode for converting an input optical signal into a current signal and a first switch having a first terminal connected to a signal output terminal of the photodiode and a second terminal for outputting the current signal generated in the photodiode, the first switch opening and closing according to the level of a charge readout instruction signal; (ii) the signal-converting circuits are provided for the respective photosensitive pixels; (iii) an output-selecting circuit for receiving digital signals outputted from all of the signal-converting circuits and selectively outputting one digital signal in response to an output instruction signal is further provided; and (iv) the timing control section further outputs the output instruction signal.

Here, the first number of photosensitive pixels may be aligned along a first direction. In this case, a linear image sensor is formed.

Also, since the signal-converting circuits are provided for the respective photosensitive pixels, in order to take out the signal currents from the photosensitive section, all of the first switches in the first number of photosensitive pixels can be substantially opened and closed at the same time according to a common charge readout instruction signal.

In such a solid-state imaging apparatus, first, digital data corresponding to the light intensities received by the photodiodes of the photosensitive pixels of the photosensitive section are outputted from the signal-converting circuits respectively provided for the photosensitive pixels as mentioned earlier.

Then, the output-selecting circuit receives the digital signals outputted from all of the signal-converting circuits and selectively outputs one digital signal according to the output instruction signal outputted from the timing control section.

Accordingly, as the timing control section changes the digital signal to be selected in time series, digital data corresponding to the light image formed by the light incident on the photosensitive section can be obtained.

As a result, the result of imaging can be read out as digital data accurately at a high speed.

The solid-state imaging apparatus of the present invention may be configured such that (i) the photosensitive section is provided with a first number, which is more than one, of vertical photosensitive sections each composed of a second number, which is more than one, of photosensitive pixels aligned in a second direction each comprising a photodiode for converting an input optical signal into a current signal and a first switch having a first terminal connected to a signal output terminal of the photodiode and a second terminal for outputting the current signal generated in the photodiode, the first switch opening and closing according to the level of a charge readout instruction signal, the first switches of the photosensitive pixels aligned in the first direction at the same position with respect to the second direction simultaneously opening and closing in response to a common charge readout instruction signal, while the first switches in the photosensitive pixels aligned in the second direction at the same position with respect to the first direction opening and closing respectively in response to charge readout instruction signals different from each other; (ii) the signal-converting circuits are provided for the respective photosensitive sections; (iii) an output-selecting circuit for receiving digital signals outputted from all of the signal-converting circuits and selectively outputting one digital signal in response to an output instruction signal is further provided; and (iv) the timing control section further outputs the output instruction signal.

In such a solid-state imaging apparatus, first, the timing control section turns on the first switches in the photosensitive pixels aligned at a first position with respect to the second direction in the photosensitive sections, thereby taking out the charges accumulated in the corresponding photosensitive pixels.

Subsequently, digital data corresponding to the light intensities received by the respective photodiodes are outputted from the signal-converting circuits provided for the respective vertical photosensitive sections as mentioned earlier.

Then, the output-selecting circuit receives the digital signals outputted from all of the signal-converting circuits and selectively outputs one digital signal according to the output instruction signal outputted from the timing control section.

Thereafter, the timing control section sets the reset instruction signal and the clamping instruction signal to their logical true levels, while the comparison control section sets the comparative voltage signal to the initial comparative voltage level, thereby executing data readout operations concerning the second and later photosensitive pixels in the second direction of each vertical photosensitive section.

As a result, the result of imaging can be read out as digital data accurately at a high speed.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, embodiments of the solid-state imaging apparatus in accordance with the present invention will be explained with reference to attached drawings. Here, in the explanation of the drawings, elements identical to each other will be referred to with marks identical to each other without their overlapping descriptions repeated.

(Embodiment 1)

Figure 1:
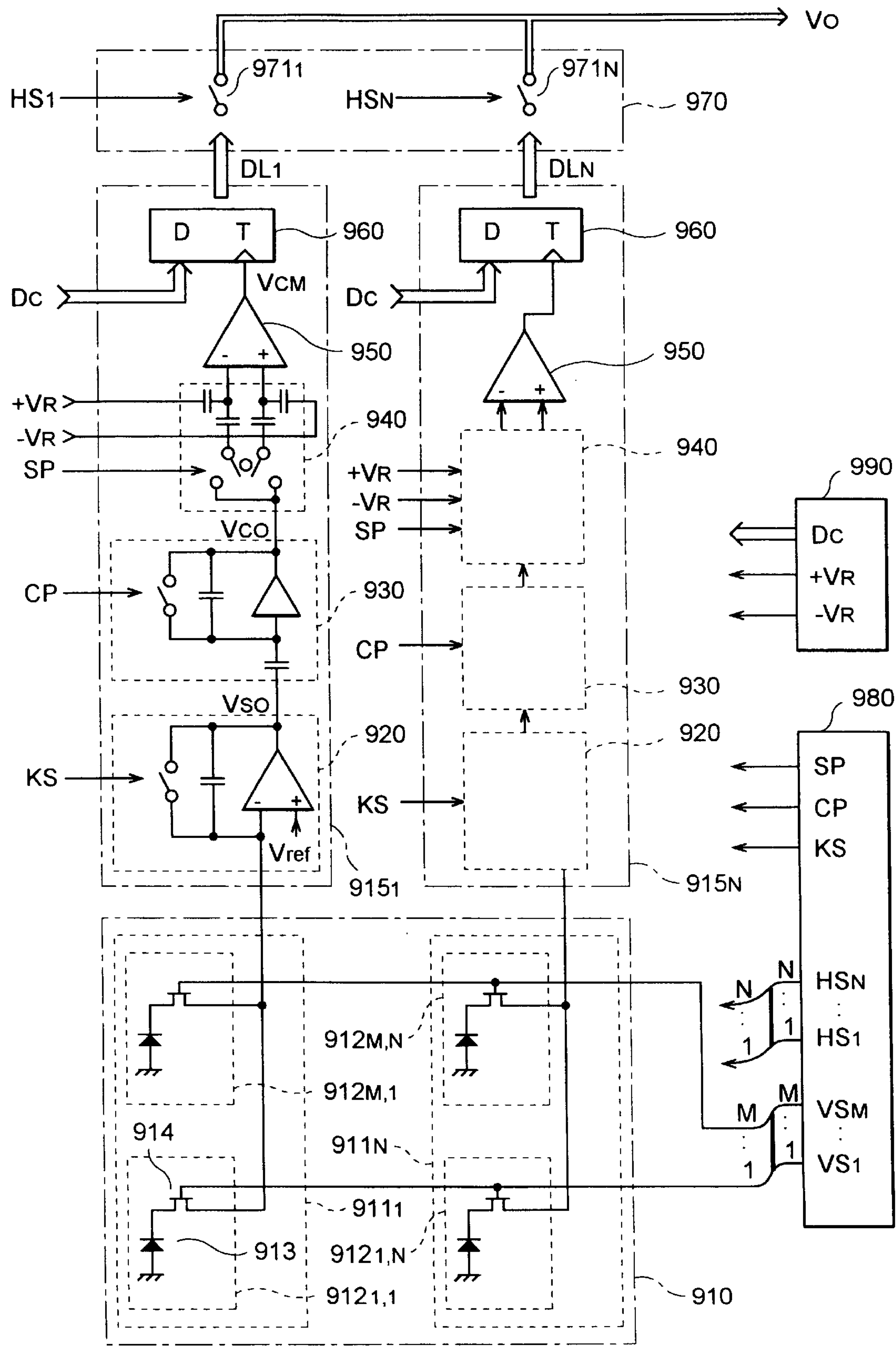
FIG. 1 is a circuit diagram of a solid-state imaging apparatus in accordance with the prior art.
Figure 2:
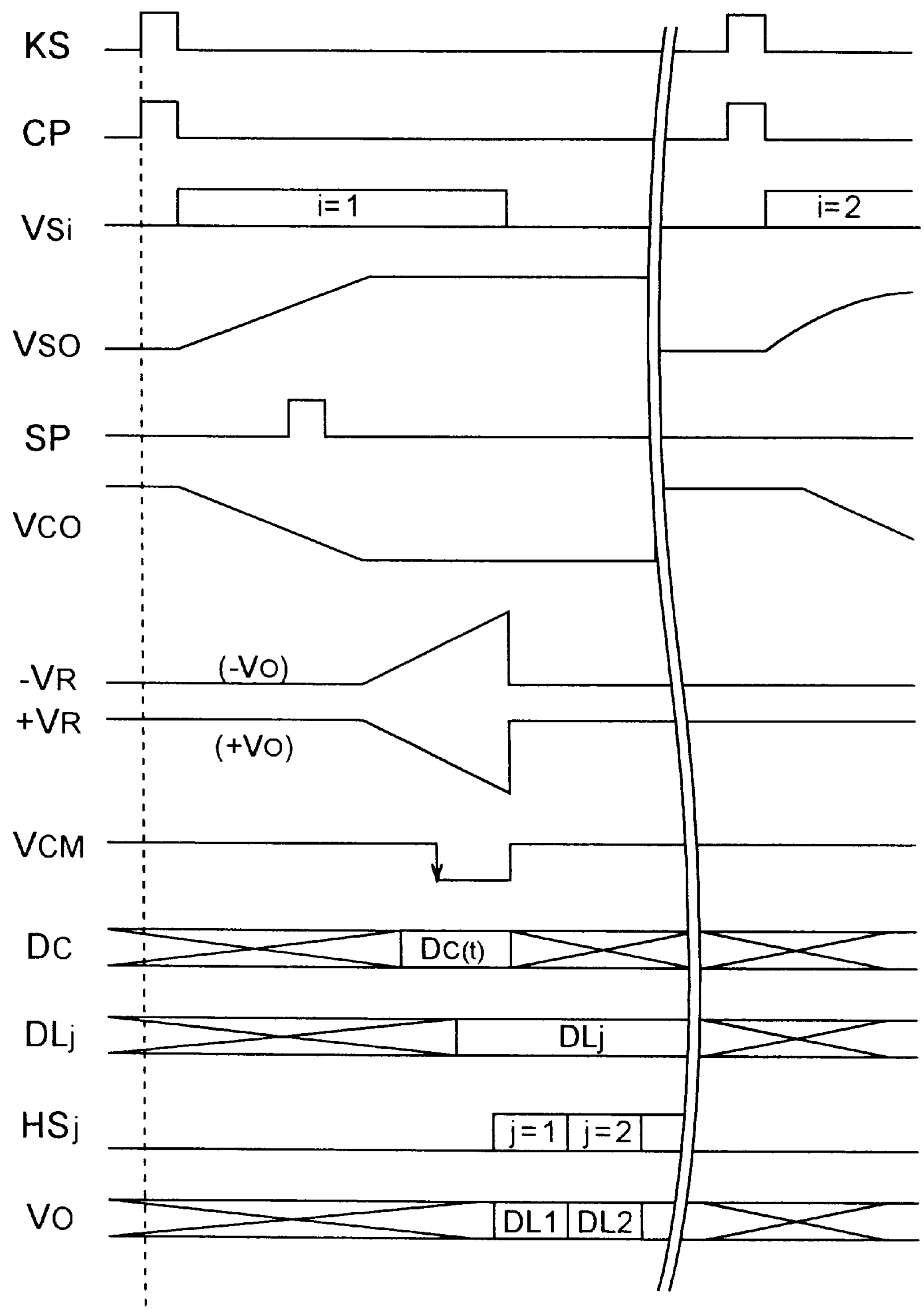
FIG. 2 is a time chart explaining operations of the solid-state imaging apparatus in accordance with the prior art.
Figure 3:
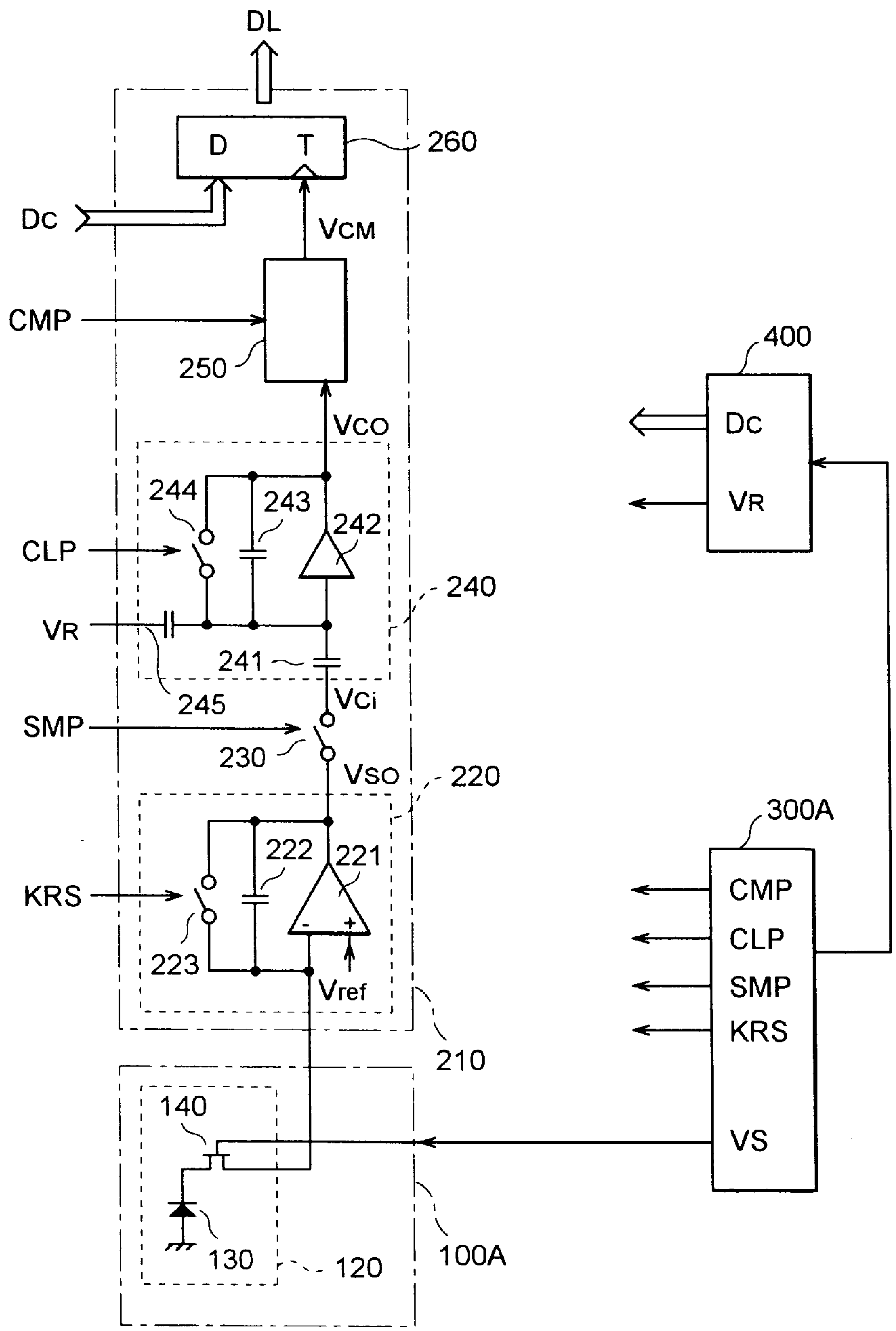
FIG. 3 is a circuit diagram of a solid-state imaging apparatus in accordance with Embodiment 1 of the present invention.

FIG. 3 is a circuit diagram showing the solid-state imaging apparatus in accordance with Embodiment 1 of the present invention. As depicted, this apparatus comprises (a) a photosensitive section 100A provided with one photosensitive pixel 120 composed of a photodiode 130 for converting an input optical signal into a current signal and a switch 140 which has a first terminal connected to a signal output terminal of the photodiode 130 and a second terminal for outputting the current signal generated in the photodiode 130 and opens and closes according to the level of a charge readout instruction signal; (b) a signal-converting circuit 210 which receives the current signal outputted from the photosensitive section 100A and outputs a digital signal corresponding to the amount of charge flowing therein due to the received current signal; (c) a timing control section 300A which outputs a charge readout instruction signal VS, a reset instruction signal KRS, a sampling instruction signal SMP, and a clamping instruction signal CLP; and (d) a comparison control section 400 which outputs a digital counter signal $D_C$ with a predetermined period in which the digital value carried thereby changes and a comparative voltage signal $V_R$ whose voltage level changes over a predetermined duration.

The signal-converting circuit 210 comprises (i) an integrating circuit 220 which receives the output signal from the photosensitive section 100A and, according to the reset instruction signal KRS, subjects a capacitor 222 having input and output terminals, between which the current signal output from the photosensitive section 100A is connected, to an integrating operation (when the reset instruction signal KRS is at its logical false level) or a nonintegrating operation (when the reset instruction signal KRS is at its logical true level); (ii) a switch 230 which receives, from one terminal, a signal $V_{SO}$ outputted from the integrating circuit 220 and outputs, from the other terminal, thus received signal in response to the sampling instruction signal SMP;

(iii) a clamping circuit 240 which receives a signal $V_{Ci}$ transmitted through the switch 230 and the comparative voltage signal $V_R$, outputs a signal $V_{CO}$ having a voltage corresponding to the voltage levels of the signal $V_{Ci}$ and comparative voltage signal $V_R$, and performs a clamping operation in response to the clamping instruction signal CLP; (iv) a comparator circuit 250 which receives the signal $V_{CO}$ outputted from the clamping circuit 240, compares the voltage of the signal $V_{CO}$ with a reference voltage $V_{ref}$, and outputs a comparison result signal $V_{CM}$ corresponding to the result of comparison; and (v) a data holding circuit 260 which receives the digital counter signal $D_C$ and the comparison result signal $V_{CM}$, holds the digital counter signal $D_C$ at the time when the comparison result signal changes, and outputs a digital signal $D_L$.

The integrating circuit 220 comprises (i) a charge amplifier 221 which receives the output signal from the photosensitive section 100A and amplifies the charge of thus received current signal; (ii) a capacitor 222 whose one terminal is connected to the input terminal of the charge amplifier 221, while the other terminal is connected to the output terminal of the charge amplifier 221; and (iii) a switch 223 whose one terminal is connected to the input terminal of the charge amplifier 221, while the other terminal is connected to the output terminal of the charge amplifier 221, and which is turned on and off respectively when the reset instruction signal KRS is at its logical true and logical false levels.

The clamping circuit 240 comprises (i) a capacitor 241 which receives the signal outputted from the integrating circuit 220 and outputs its AC component; (ii) an amplifier 242 which receives, amplifies, and outputs the signal inputted therein by way of the capacitor 241; (iii) a capacitor 243 whose one terminal is connected to the input terminal of the amplifier 242, while the other terminal is connected to the output terminal of the amplifier 242; (iv) a switch 244 whose one terminal is connected to the input terminal of the amplifier 242, while the other terminal is connected to the output terminal of the amplifier 242, and which is turned on and off respectively when the clamping instruction signal CLP is at its logical true and logical false levels; and (v) a capacitor 245 whose one terminal is connected to the input terminal of the amplifier 242, while the other terminal receives the comparative voltage $V_R$.

Figure 4:
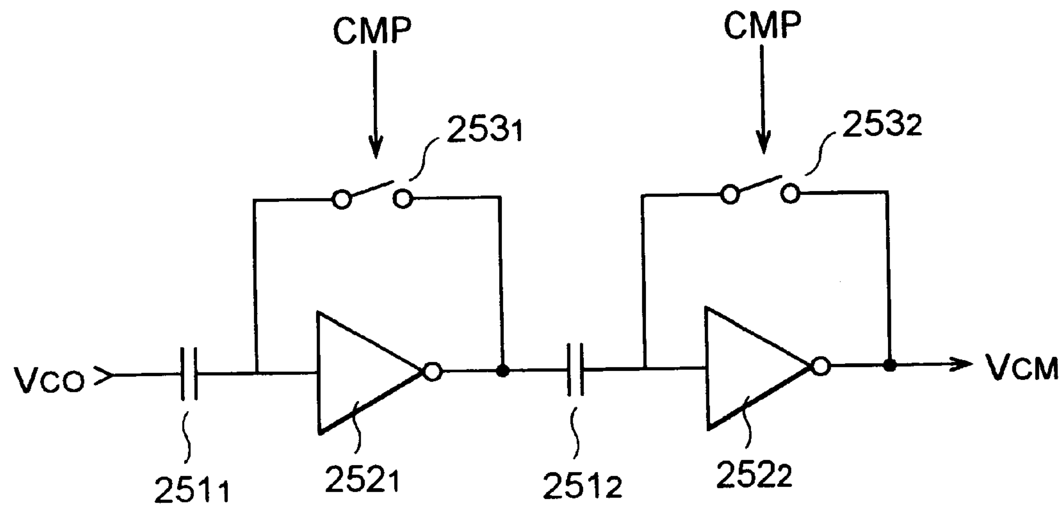
FIG. 4 is a circuit diagram of a comparator circuit in the solid-state imaging apparatus in accordance with Embodiment 1 of the present invention.
Figure 6:
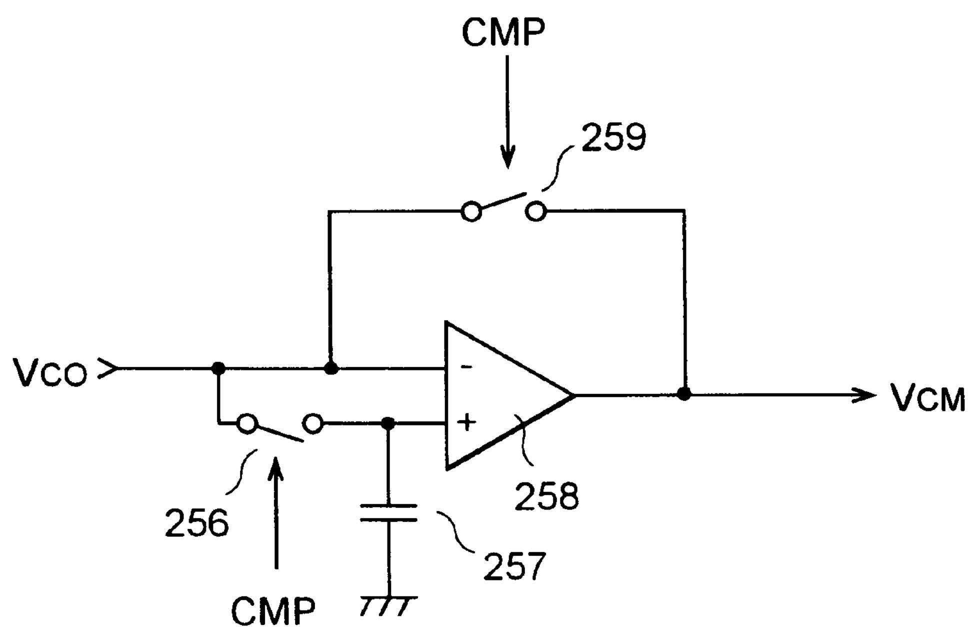
FIG. 6 is a circuit diagram of a modified example of the comparator circuit in the solid-state imaging apparatus in accordance with Embodiment 1 of the present invention.

FIGS. 4 and 6 are circuit diagrams showing configurations of the comparator circuit 250. FIG. 4 shows a configuration of a comparator circuit in which two inverters are connected in series, whereas FIG. 6 shows a configuration of a differential-type comparator circuit.

The comparator circuit shown in FIG. 4 comprises (i) a capacitor $\mathbf{251}_1$ whose one terminal receives the signal $V_{CO}$ outputted from the clamping circuit 240; (ii) an inverter $\mathbf{252}_1$ which receives the signal outputted from the other terminal of the capacitor $\mathbf{251}_1$, judges whether the voltage level of thus received signal is greater or smaller than a threshold level, and then outputs an inverted signal; (iii) a switch $\mathbf{253}_1$ whose one terminal is connected to the input terminal of the inverter $\mathbf{252}_1$, while the other terminal is connected to the output terminal of the inverter $\mathbf{252}_1$, and which opens and closes according to a comparison start instruction signal CMP; (iv) a capacitor $\mathbf{251}_2$ whose one terminal receives the signal outputted from the inverter $\mathbf{252}_1$; (v) an inverter $\mathbf{252}_2$ which receives the signal outputted from the other terminal of the capacitor $\mathbf{251}_2$, judges whether the voltage level of thus received signal is greater or smaller than a threshold level, and then outputs an inverted signal; and (vi) a switch $\mathbf{253}_2$ whose one terminal is connected to the input terminal of the inverter $\mathbf{252}_2$, while the other terminal is connected to the output terminal of the inverter $\mathbf{252}_2$, and which opens and closes according to the comparison start instruction signal CMP.

Figure 5:
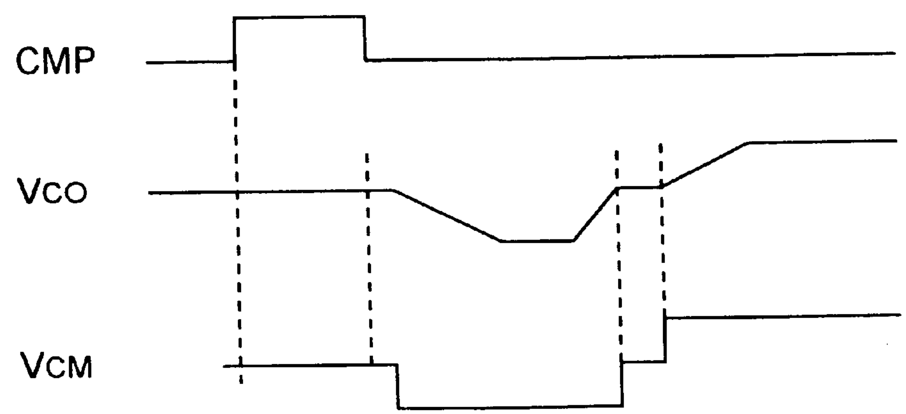
FIG. 5 is a timing chart explaining operations of the comparator circuit in the solid-state imaging apparatus in accordance with Embodiment 1 of the present invention.

The comparator circuit shown in FIG. 4 compares the reference voltage with the input signal voltage and outputs the comparison result signal $V_{CM}$ as will be explained in the following. FIG. 5 is a timing chart representing operations of the comparator circuit shown in FIG. 4.

First, before executing a comparison operation, the comparison start instruction signal CMP is temporarily set to its logical true level. The switches $\mathbf{253}_1$ and $\mathbf{253}_2$ are turned on over this logical true-level period. As a result, the input and output terminals in each of the inverters $\mathbf{252}_1$ and $\mathbf{252}_2$ are short-circuited, whereby the comparison result signal $V_{CM}$ is outputted with a medium voltage level. Then, in cases where the voltage of the signal $V_{CO}$ does not change at the moment when the comparison start instruction signal becomes its logical false level, i.e., at the moment when the switches $\mathbf{253}_1$ and $\mathbf{253}_2$ are turned off, the comparison result signal $V_{CM}$ maintains its medium voltage level.

Thereafter, when the voltage of the signal $V_{CO}$ increases or decreases, the two-stage inverter circuit amplifies the change in the signal $V_{CO}$ with a high gain and outputs thus amplified signal. Accordingly, while the voltage of the signal $V_{CO}$ at the moment when the switches $\mathbf{253}_1$ and $\mathbf{253}_2$ are turned off is taken as a reference voltage, the comparison result signal $V_{CM}$ is outputted as a signal digitally changing according to whether the signal $V_{CO}$ is greater or smaller than the reference voltage.

The comparator circuit shown in FIG. 6 comprises (i) a switch 256 whose one terminal receives the output signal $V_{CO}$ from the clamping circuit 240 and which opens and closes according to the comparison start instruction signal CMP; (ii) a capacitor 257 whose one terminal receives the signal outputted from the other terminal of the switch 256 and which accumulates the charge corresponding to the voltage of thus received signal; (iii) a differential comparator 258 whose one input terminal is connected to the one terminal of the capacitor 257, while the other input terminal receives the signal $V_{CO}$, and which outputs the comparison result signal $V_{CM}$ corresponding to whether the voltage at one input terminal is greater or smaller than the voltage at the other input terminal; and (iv) a switch 259 whose one terminal is connected to the other input terminal of the differential comparator 258, while the other terminal is connected to the output terminal of the differential comparator 258, and which opens and closes according to the comparison start instruction signal CMP.

With a timing similar to that of the comparator circuit shown in FIG. 4, the comparator circuit of FIG. 6 also outputs the comparison result signal $V_{CM}$ which digitally changes.

While the comparator circuit shown in FIG. 6 has an advantage over that of FIG. 4 in that it is more resistant to noise, it is disadvantageous in that the size of the circuit and the power consumption become greater.

Figure 7:
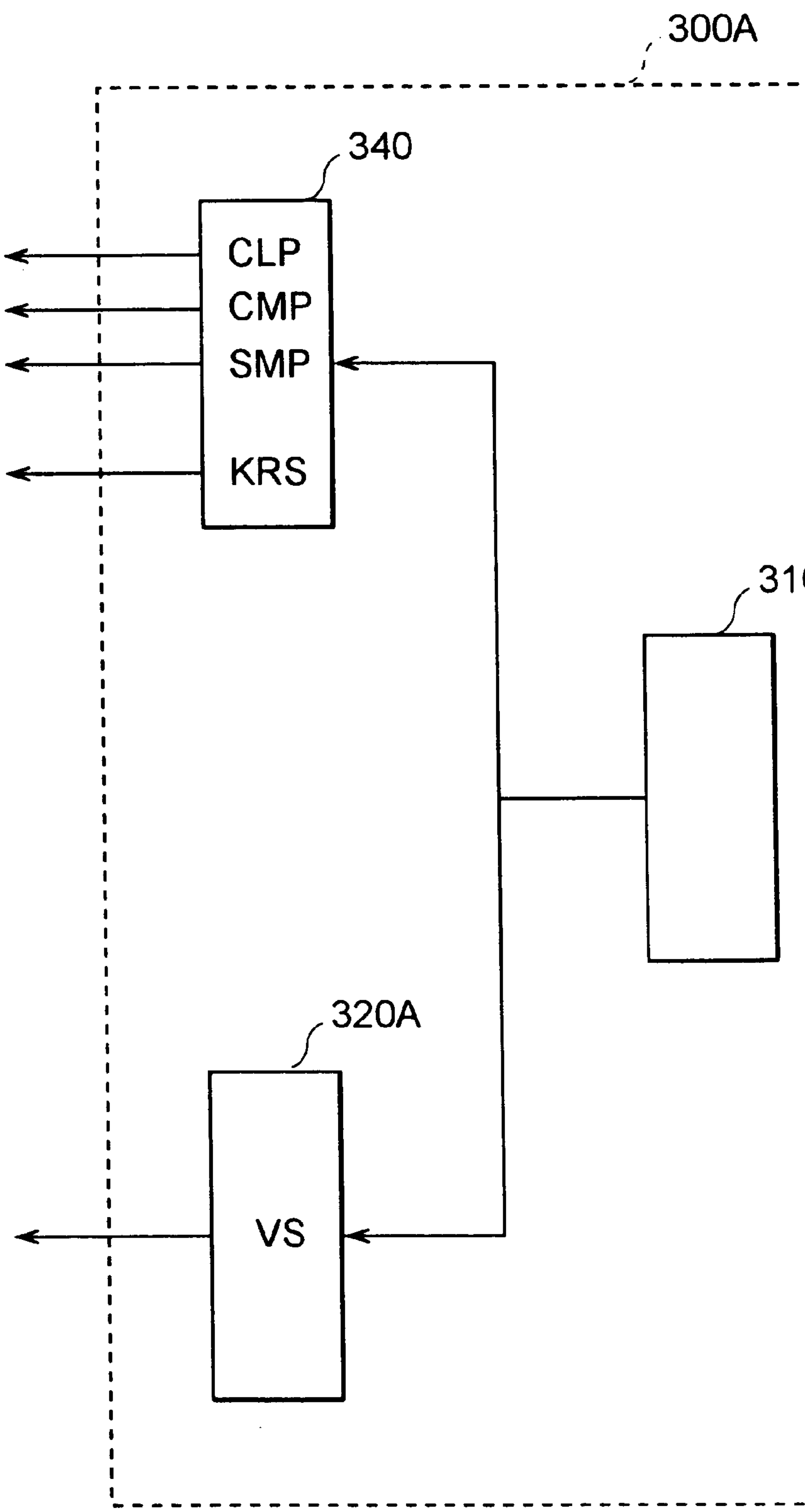
FIG. 7 is a circuit diagram of a timing control section of the solid-state imaging apparatus in accordance with Embodiment 1 of the present invention.

FIG. 7 is a circuit diagram of the timing control section 300A. As depicted, the timing control section 300A comprises (i) a basic timing generator 310 for generating a basic timing for a data readout operation; (ii) a driving circuit 320 for outputting a charge readout instruction signal VS in synchronization with the basic timing signal outputted from the basic timing generator 310; and (iii) a control signal generator 340 for generating the reset instruction signal KRS, clamping instruction signal CLP, sampling instruction signal SMP, and comparison start instruction signal CMP in response to the basic timing signal outputted from the basic timing generator 310.

Figure 8:
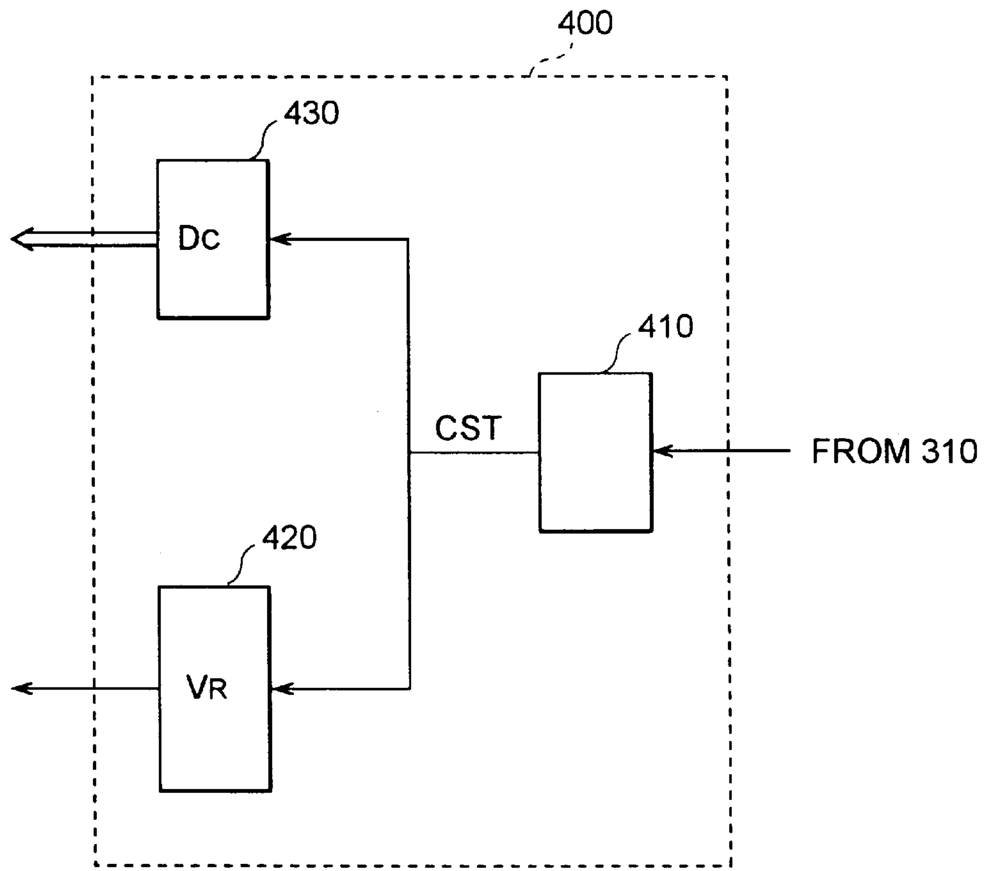
FIG. 8 is a circuit diagram of a comparison control section of the solid-state imaging apparatus in accordance with Embodiment 1 of the present invention.

FIG. 8 is a circuit diagram of the comparison control section 400. As depicted, the comparison control section 400 comprises (i) a comparison control start instructing section 410 for generating a comparison start timing instruction signal CST in synchronization with the basic timing signal outputted from the basic timing generator 310; (ii) a comparative voltage signal generator 420 for outputting, in response to the comparison start instruction according to the signal CST, the comparative voltage signal $V_R$ whose voltage linearly changes over time; and (iii) a counter circuit 430 which, in response to the comparison start instruction according to the signal CST, performs counting with a predetermined period and outputs the digital counter signal $D_C$.

Figure 9:
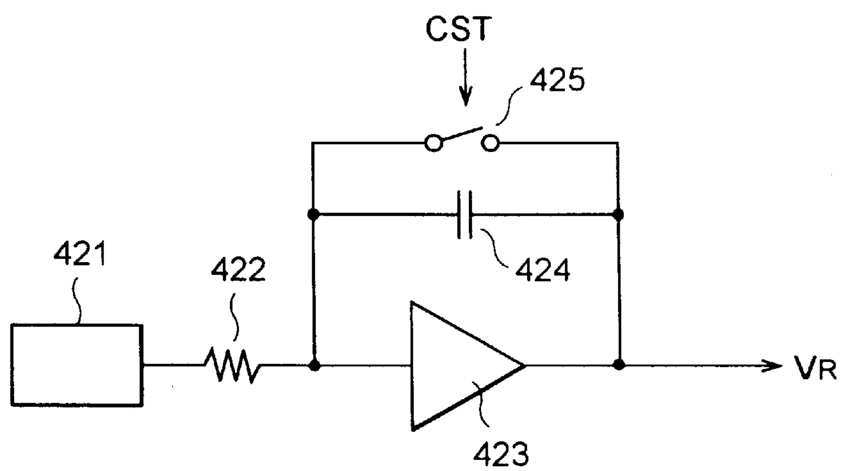
FIG. 9 is a circuit diagram of a comparative voltage signal generating section of the solid-state imaging apparatus in accordance with Embodiment 1 of the present invention.

FIG. 9 is a circuit diagram showing a configuration of the comparative voltage signal generator 420. As depicted, this comparative voltage signal generator comprises (i) a DC voltage generating circuit 421 for generating a DC voltage; (ii) a resistor 422 having one terminal to which the DC voltage outputted from the DC voltage generating circuit 421 is applied; (iii) an amplifier 423 whose input terminal is connected to the other terminal of the resistor 422; (iv) a capacitor 424 whose one terminal is connected to the input terminal of the amplifier 423, while the other terminal is connected to the output terminal of the amplifier 423; and (v) a switch 425 whose one terminal is connected to the input terminal of the amplifier 423, while the other terminal is connected to the output terminal of the amplifier 423, and which opens and closes according to the signal CST.

In accordance with the comparative voltage signal generator shown in FIG. 9, the comparative voltage signal $V_R$ whose voltage linearly changes over time from the moment when the switch 425 is turned off, while the output voltage level at the moment when the switch 425 is turned on in response to the signal CST is taken as its start voltage level, is generated by the signal CST having a long period.

Figure 10:
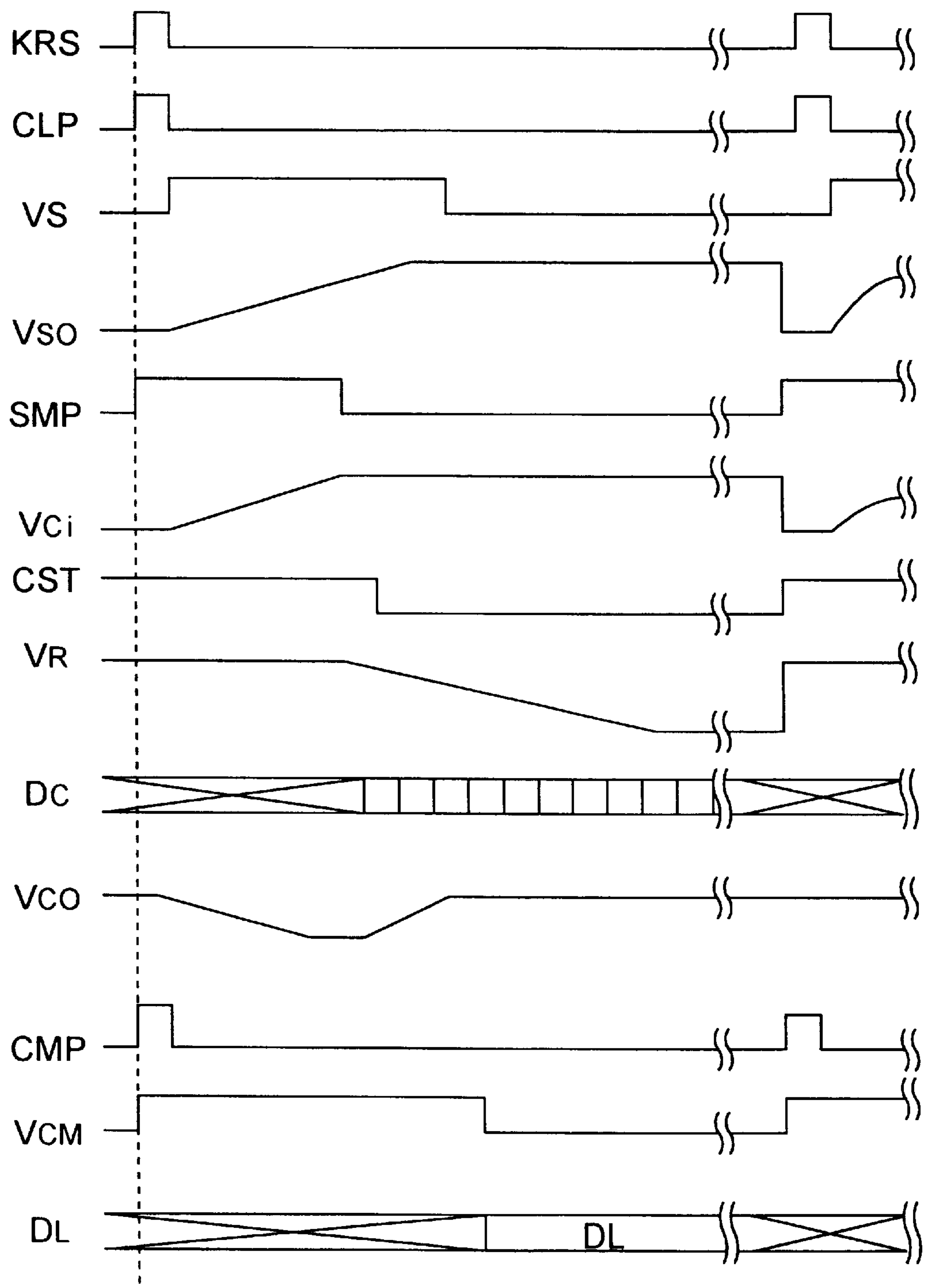
FIG. 10 is a timing chart explaining operations of the solid-state imaging apparatus in accordance with Embodiment 1 of the present invention.

As will be explained in the following, the apparatus of this embodiment collects light image data inputted into the photosensitive section 100A. FIG. 10 is a timing chart explaining operations of the apparatus in accordance with this embodiment.

In the solid-state imaging apparatus of this embodiment, the photosensitive section 100A receives a light image formed by the light incident thereon, whereby a charge corresponding to the light intensity is accumulated in the photodiode 130 of the photosensitive section 100A. Then, after the lapse of a predetermined detecting period, digital data corresponding to the amount of charge accumulated in the photodiode 130 are read out as follows.

First, before executing a readout operation, the timing control section 300A sets the reset instruction signal KRS to its logical true level so as to set the output of the integrating circuit 220 to the reference voltage $V_{ref}$ which is its initial level, while setting the clamping instruction signal CLP to its logical true level so as to set the input/output voltage of the clamping circuit 240 to the initial level $V_{ref}$. Further, the sampling instruction signal SMP is set to its logical true level so as to turn on the switch 230. Also, the comparison control section 400 sets the comparative voltage signal to the initial comparative voltage level $V_{ref}$.

Then, the timing control section 300A sets the reset instruction signal KRS and clamping instruction signal CLP to their logical false levels, while maintaining the sampling instruction signal SMP at its logical true level. Thereafter, the timing control section 300A sets the charge readout instruction signal VS, which turns on the switch 140 in the photosensitive pixel 120, to its logical true level and outputs thus set signal. When the switch 140 is turned on, the charge accumulated in the photodiode 130 due to the light received so far is outputted from the photosensitive section 100A as a current signal. This current signal is accumulated by the integrating circuit 220 at the capacitor 222, which is its feedback capacitor, and then is outputted therefrom as a voltage. The signal $V_{SO}$ outputted from the integrating circuit 220 is inputted into the clamping circuit 240 by way of the second switch 230.

After the lapse of a predetermined time since the switch 140 of the photosensitive pixel 120 is turned on, the timing control section 300 sets the sampling instruction signal SMP to its logical false level, thereby turning off the switch 230. After the switch 230 is turned off, the input terminal of the clamping circuit 240 is held at the voltage level of the signal $V_{SO}$ at the moment when the switch 230 is turned off.

In this case, regardless of the operating speed of the whole apparatus, the charge-accumulating capacitor 241 in the clamping circuit 240 can have a larger capacity level, whereby kTC noise, which is inversely proportional to the capacity level, can be sufficiently reduced.

Also, it is not always necessary for a high-performance operational amplifier or the like to be used in the first stage of the clamping circuit 240, whereby the power consumption is prevented from increasing.

The comparison control section 400 starts a comparison control operation when the signal CST changes after the sampling instruction signal SMP changes to its logical false level. Namely, as triggered by the change in the signal CST, the comparison control section 400 successively lowers the voltage level of the comparative voltage signal $V_R$ with a constant gradient. As a result, the voltage level of the signal $V_{CO}$ outputted from the clamping circuit 240 successively increases.

Also, as the voltage level of the comparative voltage signal $V_R$ begins to decrease, the comparison control section 400 starts counting by means of the counter circuit 430 with a clock having a predetermined period and outputs the counted value as the digital counter signal $D_C$.

The sample signal outputted from the clamping circuit 240 is inputted into the comparator circuit 250, where the voltage level of thus inputted signal is compared with the reference voltage level $V_{ref}$.

As the voltage level of the comparative voltage signal $V_R$ decreases, the voltage of the signal $V_{CO}$ outputted from the clamping circuit 240 coincides with the reference voltage $V_{ref}$ of the comparator circuit 250 at a certain moment. As a result, the comparison result signal $V_{CM}$ changes between before and after the moment when the voltage of the signal $V_{CO}$ outputted from the clamping circuit 240 coincides with the reference voltage $V_{ref}$.

The data holding circuit 260 inputs the comparison result signal $V_{CM}$ to its trigger terminal, latches the level of the digital signal $D_L$ at the moment when the comparison result signal $V_{CM}$ changes, and then holds and outputs thus latched signal.

(Embodiment 2)

Figure 11:
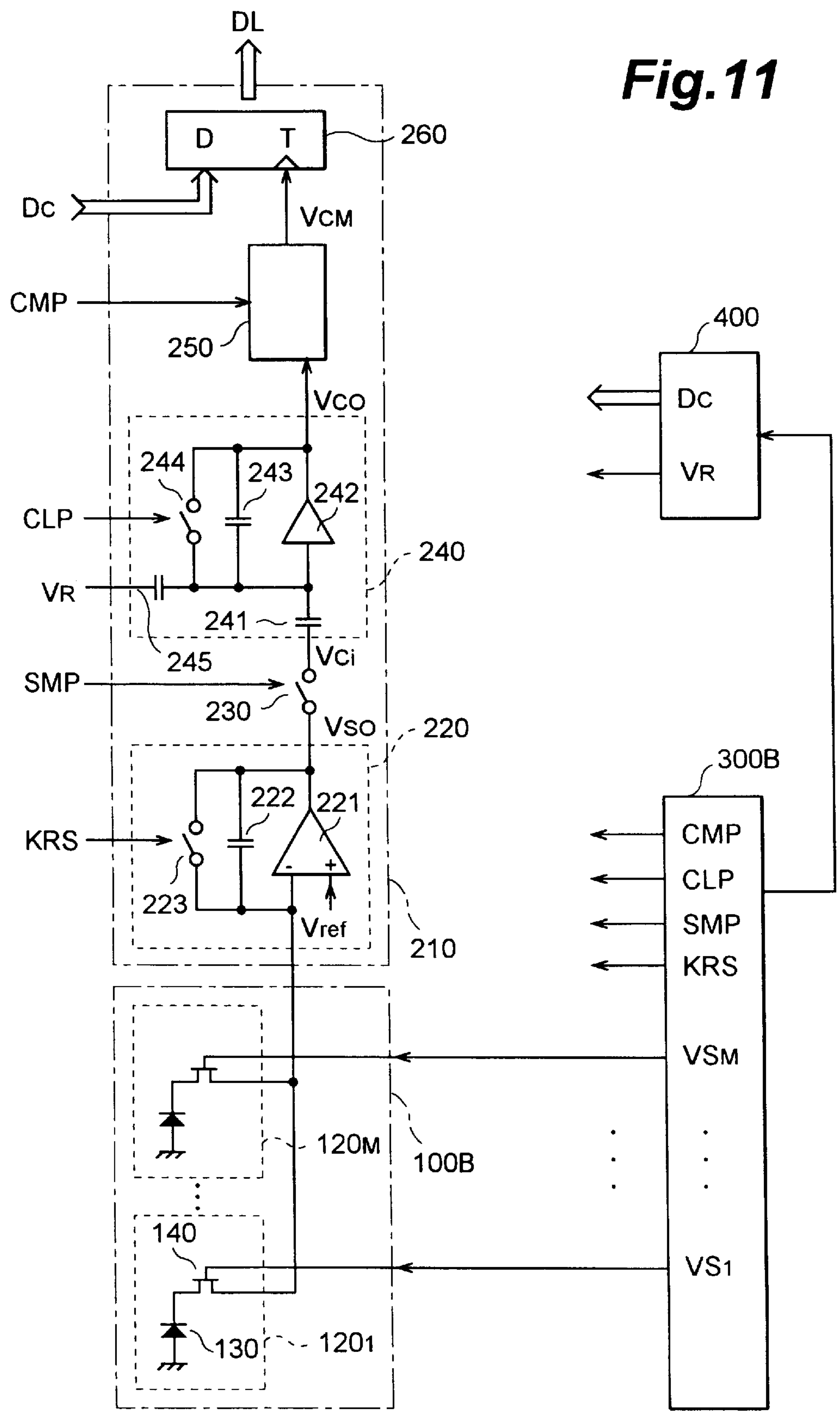
FIG. 11 is a circuit diagram of a solid-state imaging apparatus in accordance with Embodiment 2 of the present invention.

FIG. 11 is a configurational view showing the solid-state imaging apparatus in accordance with Embodiment 2 of the present invention. As depicted, this apparatus comprises (a) a photosensitive section 100B provided with one-dimensionally aligned photosensitive pixels $\mathbf{120}_i$ (i=1 to M) in which the switches 140 open and close according to the level of the charge readout instruction signal VSi; (b) signal-converting circuit 210 which receives the current signals outputted from the photosensitive section 100B, and output digital signals DL corresponding to amounts of charge flowing therein due to the received current signal; (c) a timing control section 300B for outputting the charge readout instruction signals VSi, reset instruction signal KRS, sampling instruction signal SMP, and clamping instruction signal CLP; and (d) the comparison control section 400 which outputs the counter digital signal $D_C$ with a predetermined period in which the digital value carried thereby changes and the comparative voltage signal $V_R$ whose voltage level changes over a predetermined duration.

Figure 12:
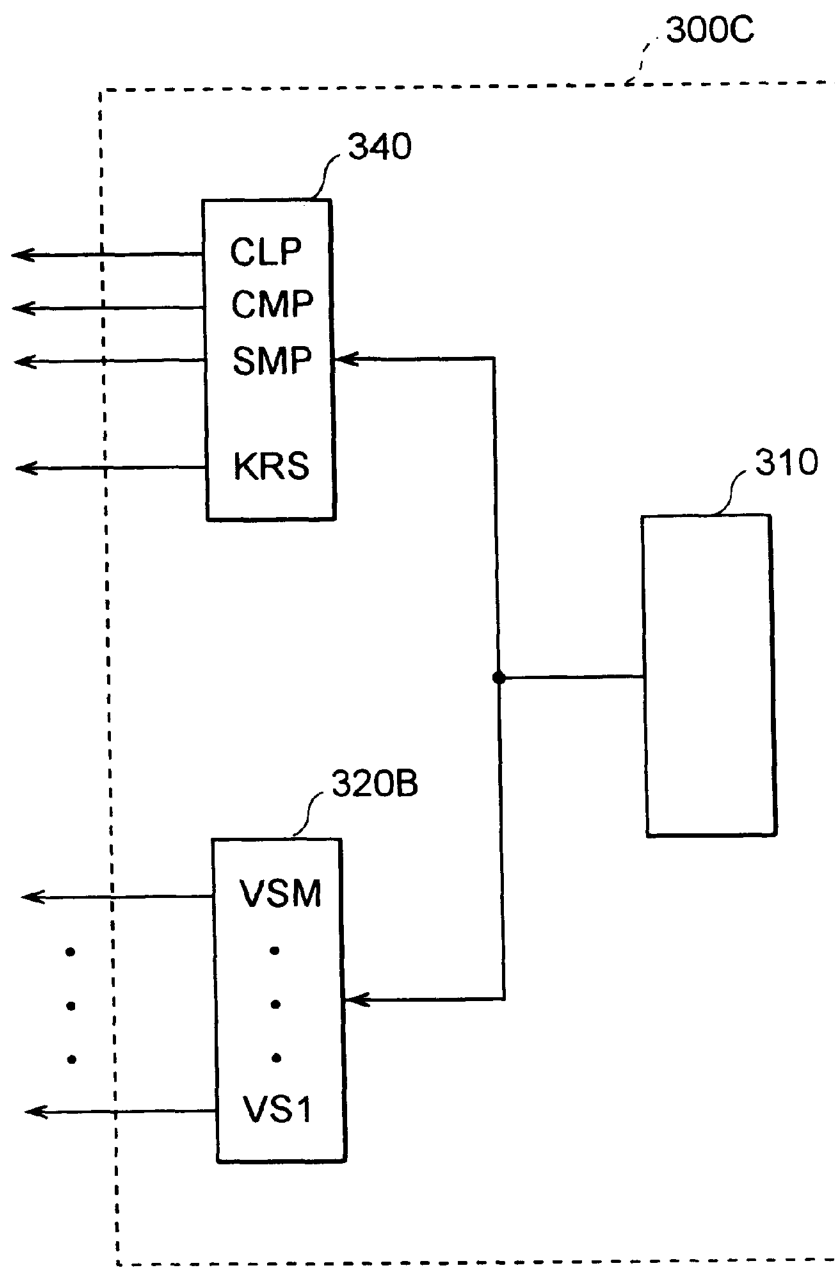
FIG. 12 is a circuit diagram of a timing control section of the solid-state imaging apparatus in accordance with Embodiment 2 of the present invention.

FIG. 12 is a circuit diagram of the timing control section 300B. As depicted, the timing control section 300B comprises (i) the basic timing generator 310 for generating a basic timing for a data readout operation; (ii) a driving circuit 320B for outputting the charge readout instruction signal VSi in synchronization with the basic timing signal outputted from the basic timing generator 310; and (iii) the control signal generator 340 for generating the reset instruction signal KRS, clamping instruction signal CLP, sampling instruction signal SMP, and comparison start instruction signal CMP in response to the basic timing signal outputted from the basic timing generator 310.

Figure 13:
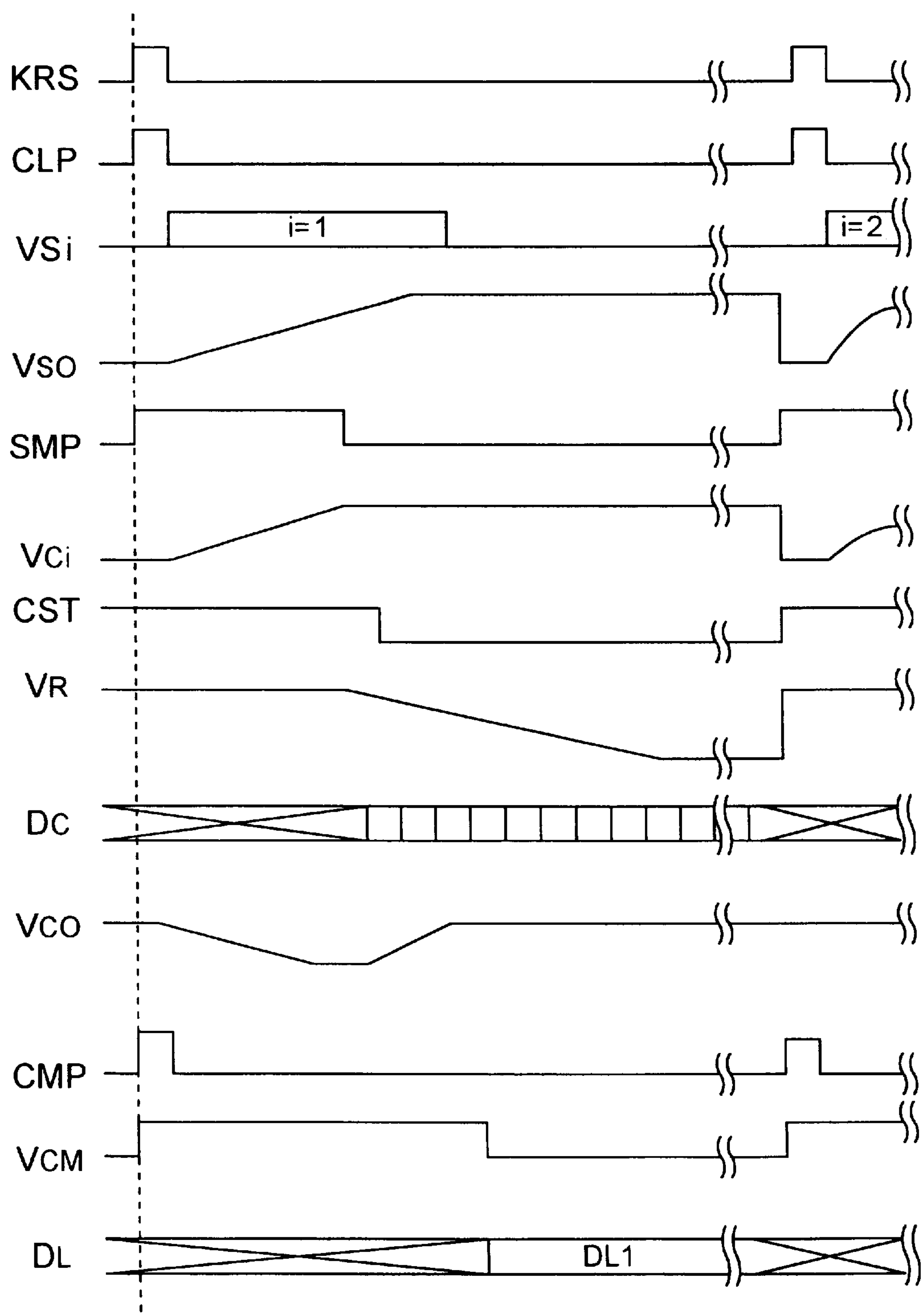
FIG. 13 is a timing chart explaining operations of the solid-state imaging apparatus in accordance with Embodiment 2 of the present invention.

As will be explained in the following, the apparatus of this embodiment collects light image data inputted into the photosensitive section 100B. FIG. 13 is a timing chart explaining operations of the apparatus in accordance with this embodiment.

In the solid-state imaging apparatus of this embodiment, the photosensitive section 100B receives a light image formed by the light incident thereon, whereby a charge corresponding to the received light intensity is accumulated in each photodiode 130 of the photosensitive section 100B. Then, after the lapse of a predetermined detecting period, digital data corresponding to the amount of charge accumulated in each photodiode 130 are read out as follows.

First, before executing a readout operation, the timing control section 300B sets the reset instruction signal KRS to its logical true level so as to set the output of the integrating circuit 220 to the reference voltage $V_{ref}$ which is its initial level, while setting the clamping instruction signal CLP to its logical true level so as to set the input/output voltage of the clamping circuit 240 to the initial level $V_{ref}$. Further, the sampling instruction signal SMP is set to its logical true level so as to turn on the switch 230. Also, the comparison control section 400 sets the comparative voltage signal to the initial comparative voltage level $V_{ref}$.

Then, the timing control section 300B sets the reset instruction signal KRS and clamping instruction signal CLP to their logical false levels, while maintaining the sampling instruction signal SMP at its logical true level. Thereafter, the timing control section 300B sets the charge readout instruction signal VS1, which turns on the switch 140 in the photosensitive pixel $\mathbf{120}_1$, to its logical true level and outputs thus set signal. When the switch 140 in the photosensitive pixel $\mathbf{120}_1$ is turned on, the charge accumulated in the corresponding photodiode 130 due to the light received so far is outputted from the photosensitive section 100B as a current signal.

The signal-converting circuit 210 which have received the current signal from the photosensitive section $\mathbf{100}_B$ is operated in a manner similar to that in Embodiment 1, and output the respective digital signals DL.

Then the timing control section 300B sets the reset instruction signal KRS and the clamping instruction signal CLP to their logical true levels, while the comparison control section 400 sets the comparative voltage signal SMP to the initial comparative voltage level, thereby executing data readout operations concerning the second and later photosensitive pixels $\mathbf{120}_i$ of the photosensitive section 100B.

(Embodiment 3)

Figure 14:
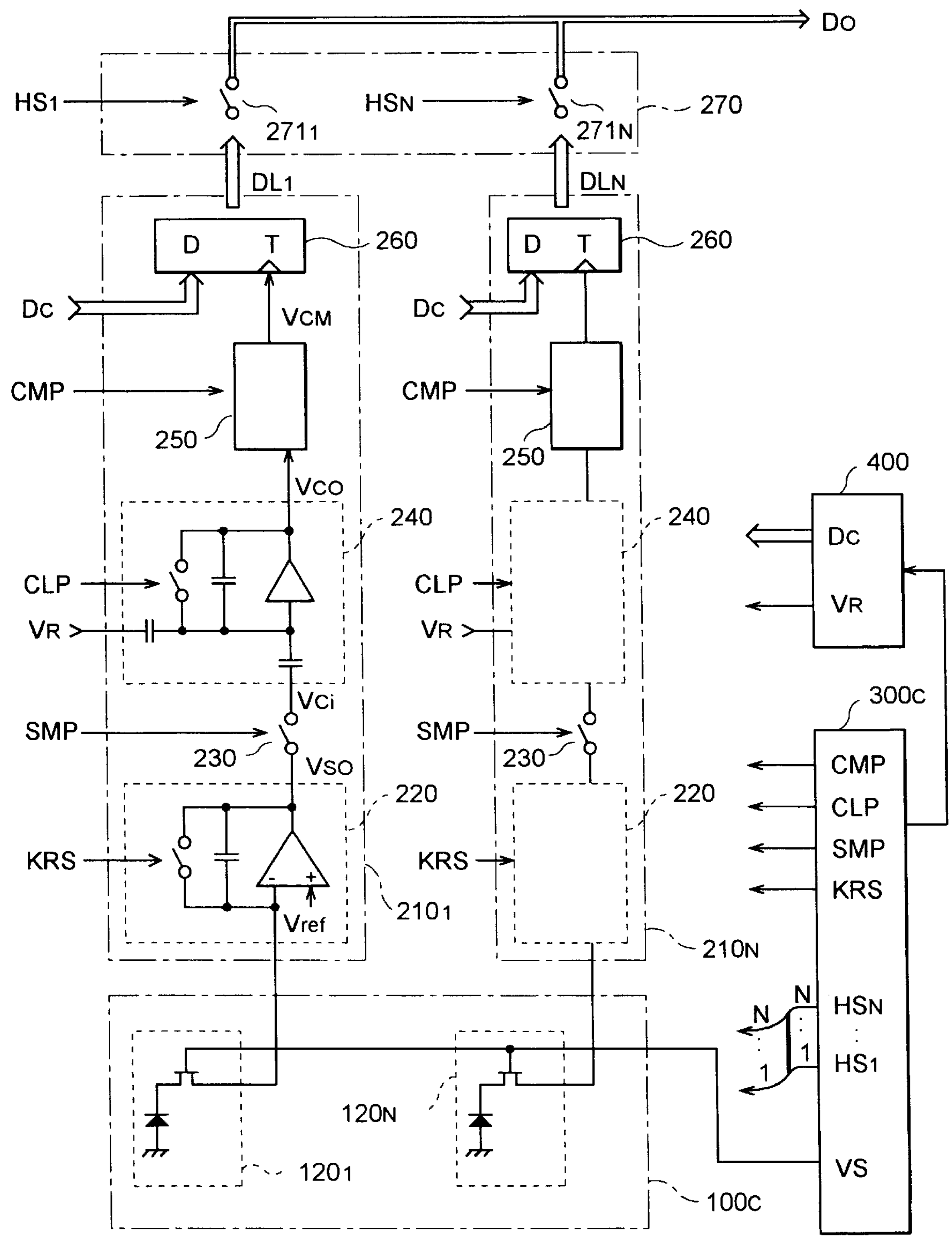
FIG. 14 is a circuit diagram of a solid-state imaging apparatus in accordance with Embodiment 3 of the present invention.

FIG. 14 is a configurational view showing the solid-state imaging apparatus in accordance with Embodiment 3 of the present invention. As depicted, this apparatus comprises (a) a photosensitive section 100C provided with one-dimensionally aligned photosensitive pixels $\mathbf{120}_j$ (j=1 to N) in which all of the switches 140 open and close according to the level of the charge readout instruction signal VS; (b) signal-converting circuits $\mathbf{210}_j$ which are provided for the respective photosensitive pixels $\mathbf{120}_j$ in the photosensitive section 100C, receive the current signals outputted from the photosensitive section 100C, and output digital signals DLj corresponding to amounts of charge flowing therein due to the received current signals; (c) an output-selecting circuit 270 which receives the digital signals DLj outputted from all of the signal-converting circuits $\mathbf{210}_j$ at respective switches $\mathbf{271}_j$ and, in response to horizontal scanning signals HSj, selectively outputs the respective digital signals DLj one by one; (d) a timing control section 300C for outputting the charge readout instruction signal VS, reset instruction signal KRS, sampling instruction signal SMP, clamping instruction signal CLP, and horizontal scanning signals HSj; and (d) the comparison control section 400 which outputs the counter digital signal $D_C$ with a predetermined period in which the digital value carried thereby changes and the comparative voltage signal $V_R$ whose voltage level changes over a predetermined duration.

Figure 15:
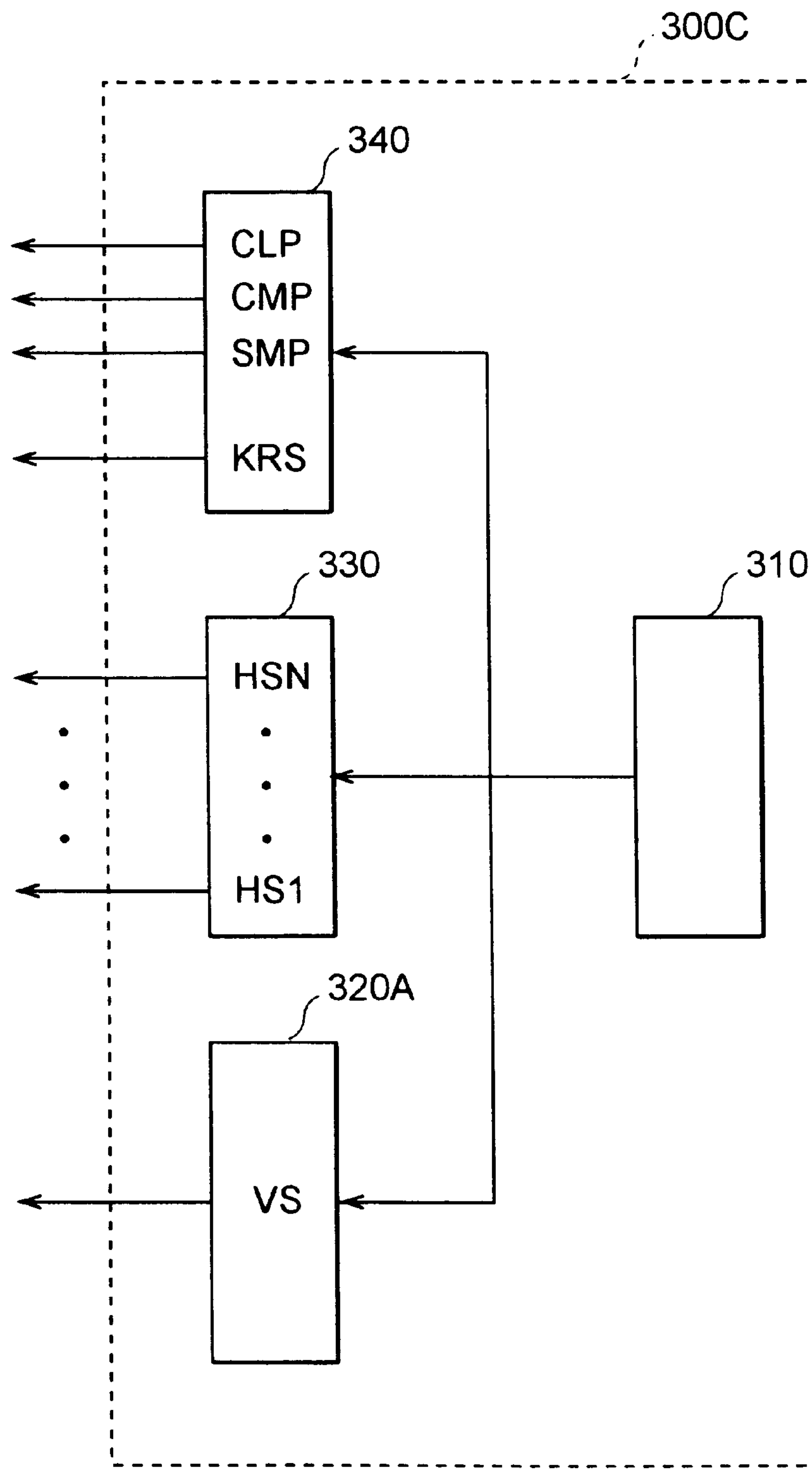
FIG. 15 is a circuit diagram of a timing control section of the solid-state imaging apparatus in accordance with Embodiment 3 of the present invention.

FIG. 15 is a circuit diagram of the timing control section 300C. As depicted, the timing control section 300C comprises (i) the basic timing generator 310 for generating a basic timing for a data readout operation; (ii) a driving circuit 320A for outputting the charge readout instruction signal VS in synchronization with the basic timing signal outputted from the basic timing generator 310; (iii) a horizontal shift register 330 for outputting the horizontal scanning signals HSj in synchronization with the basic timing signal outputted from the basic timing generator 310; and (iv) the control signal generator 340 for generating the reset instruction signal KRS, clamping instruction signal CLP, sampling instruction signal SMP, and comparison start instruction signal CMP in response to the basic timing signal outputted from the basic timing generator 310.

Figure 16:
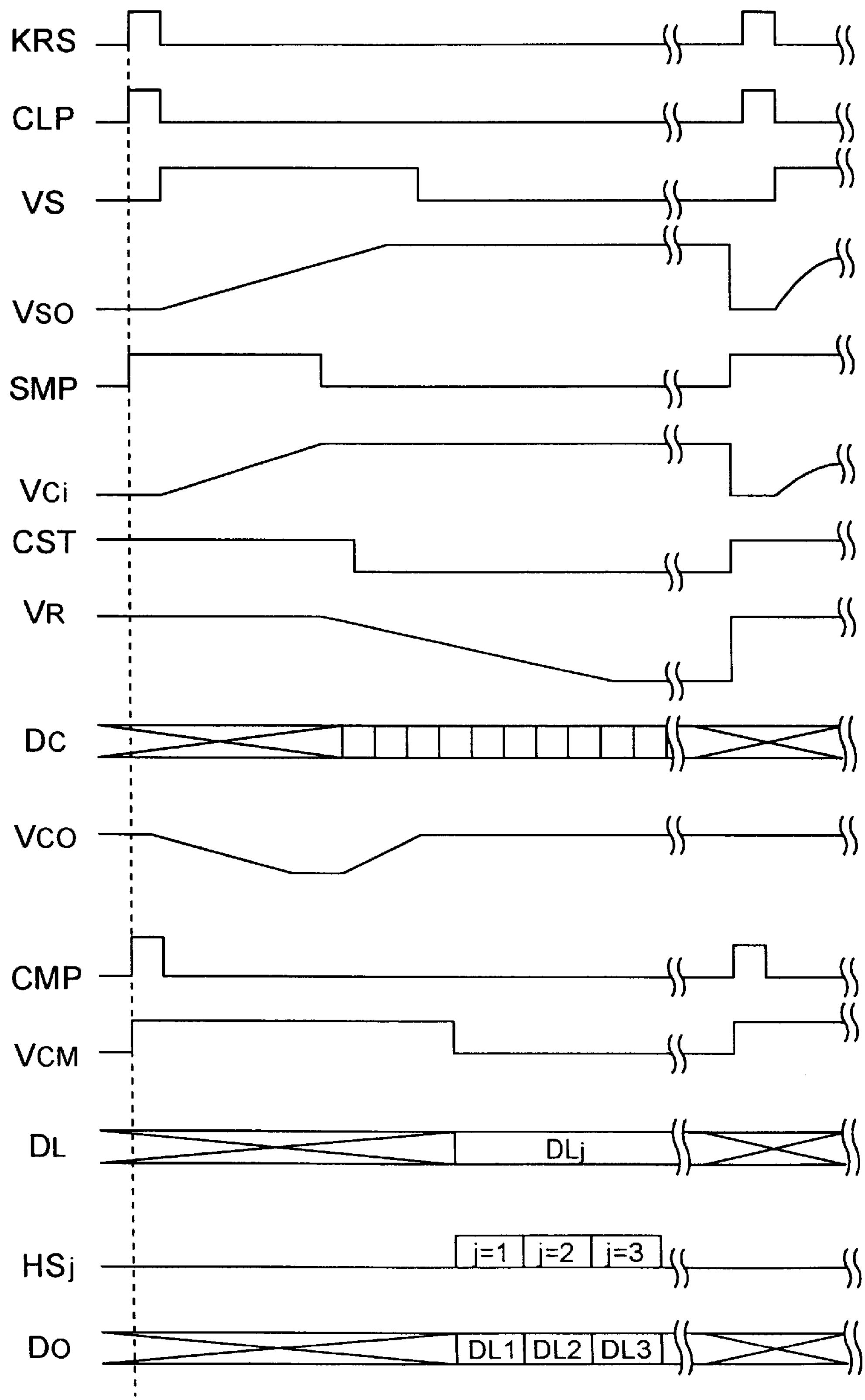
FIG. 16 is a timing chart explaining operations of the solid-state imaging apparatus in accordance with Embodiment 3 of the present invention.

As will be explained in the following, the apparatus of this embodiment collects light image data inputted into the photosensitive section 100C. FIG. 16 is a timing chart explaining operations of the apparatus in accordance with this embodiment.

In the solid-state imaging apparatus of this embodiment, the photosensitive section 100C receives a light image formed by the light incident thereon, whereby a charge corresponding to the received light intensity is accumulated in each photodiode 130 of the photosensitive section 100C. Then, after the lapse of a predetermined detecting period, digital data corresponding to the amount of charge accumulated in each photodiode 130 are read out as follows.

First, before executing a readout operation, the timing control section 300C sets the reset instruction signal KRS to its logical true level so as to set the output of the integrating circuit 220 to the reference voltage $V_{ref}$ which is its initial level, while setting the clamping instruction signal CLP to its logical true level so as to set the input/output voltage of the clamping circuit 240 to the initial level $V_{ref}$. Further, the sampling instruction signal SMP is set to its logical true level so as to turn on the switch 230. Also, the comparison control section 400 sets the comparative voltage signal to the initial comparative voltage level $V_{ref}$.

Then, the timing control section 300C sets the reset instruction signal KRS and clamping instruction signal CLP to their logical false levels, while maintaining the sampling instruction signal SMP at its logical true level. Thereafter, the timing control section 300C sets the charge readout instruction signal VS, which turns on the switches 140 in the respective photosensitive pixels $\mathbf{120}_j$, to its logical true level and outputs thus set signal. When each switch 140 is turned on, the charge accumulated in the corresponding photodiode 130 due to the light received so far is outputted from the photosensitive section 100C as a current signal.

The signal-converting circuits $\mathbf{210}_j$ which have received the current signals from their corresponding photosensitive pixels $\mathbf{120}_j$ are operated in a manner similar to that in Embodiment 1, and output the respective digital signals DLj.

Then, according to the setting of the horizontal scanning signal HSj, a data readout operation concerning the first photosensitive pixel $\mathbf{120}_1$ is started.

The timing control section 300C outputs a horizontal scanning signal HS1 which instructs only the switch $\mathbf{271}_1$ corresponding to the first photosensitive pixel $\mathbf{120}_1$ to be selected, thereby turning on only the switch $\mathbf{271}_1$ corresponding to the first photosensitive pixel $\mathbf{120}_1$.

Then, a digital signal DL1 transmitted through the switch $\mathbf{271}_1$ is outputted as an output data signal corresponding to the light intensity incident on the first photosensitive pixel $\mathbf{120}_1$.

Subsequently, the horizontal scanning signal HS1 instructing only the switch $\mathbf{271}_1$ corresponding to the first photosensitive pixel $\mathbf{120}_1$ to be selected is canceled, whereby the data readout operation concerning the first photosensitive pixel $\mathbf{120}_1$ is terminated.

Then, as with the first photosensitive pixel $\mathbf{120}_1$, data readout operations concerning the second and later photosensitive pixels $\mathbf{120}_j$ are executed.

(Embodiment 4)

Figure 17:
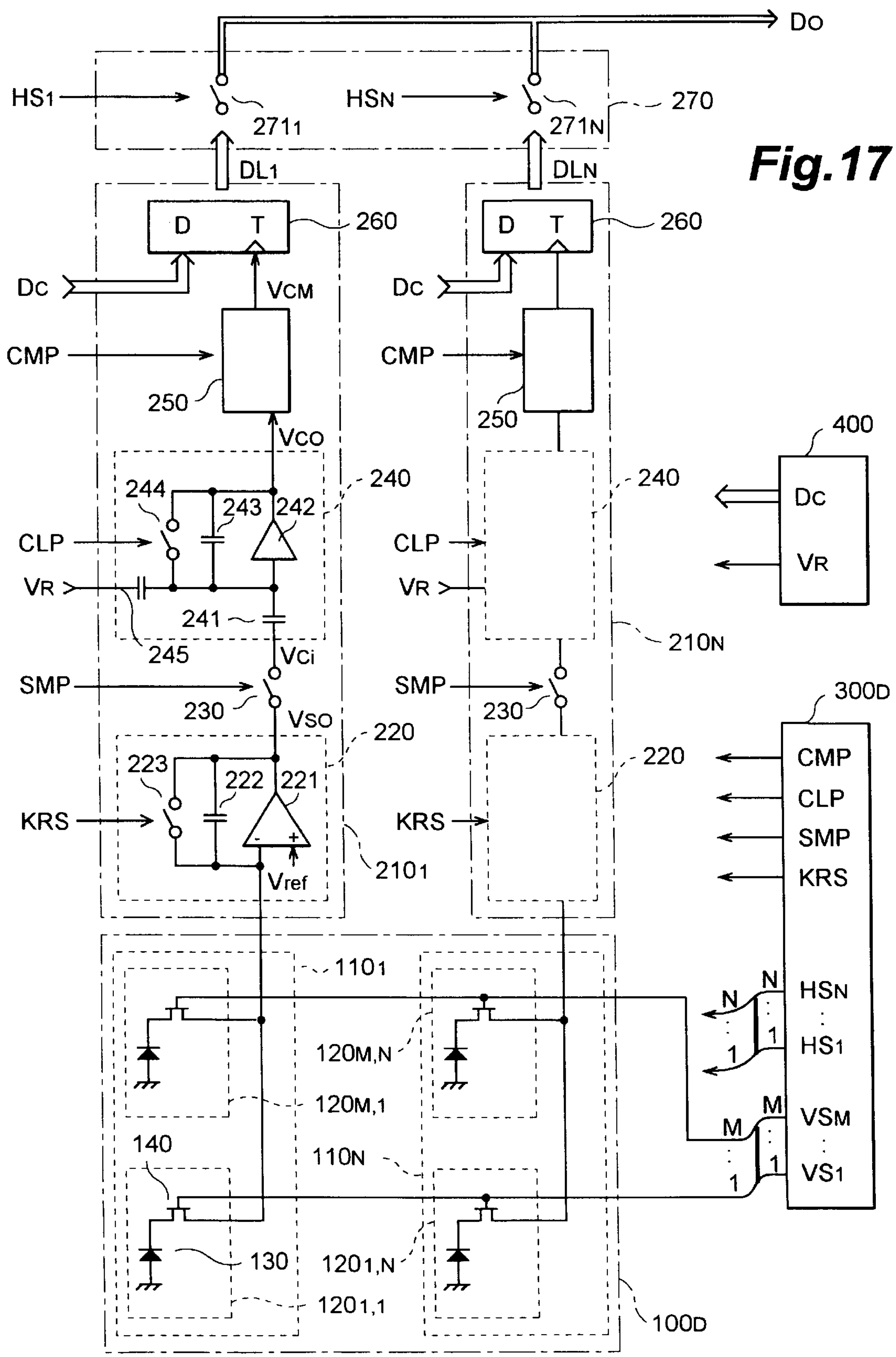
FIG. 17 is a circuit diagram of a timing control section of the solid-state imaging apparatus in accordance with Embodiment 4 of the present invention.

FIG. 17 is a configurational view showing the solid-state imaging apparatus in accordance with Embodiment 4 of the present invention. As depicted, this apparatus comprises (a) a photosensitive section 100D provided with horizontally aligned vertical photosensitive sections $\mathbf{110}_j$ (j=1 to M) each of which comprises vertically aligned photosensitive pixels $\mathbf{120}_{i,j}$ (i=1 to M) in which each switch 140 opens and closes according to the level of received charge readout instruction signal, the switches 140 of the photosensitive pixels $\mathbf{120}_{i0,j}$ vertically aligned at the same position with respect to the horizontal direction simultaneously open and close according to a common vertical scanning signal VSi0, and the switches 140 of the photosensitive pixels $\mathbf{120}_{i,j0}$ horizontally aligned at the same position with respect to the vertical direction respectively open and close according to respective vertical scanning signals VSi different from each other; (b) the signal-converting circuits $\mathbf{210}_j$ which are provided for the respective vertical photosensitive sections $\mathbf{110}_j$ in the photosensitive section 100D, receive the current signals outputted from the photosensitive section 100D, and output digital signals DLj corresponding to amounts of charge flowing therein due to received current signals; (c) the output-selecting circuit 270 which receives the digital signals DLj outputted from all of the signal-converting circuits $\mathbf{210}_j$ at the respective switches $\mathbf{271}_j$ and, in response to horizontal scanning signals HSj, selectively outputs the respective digital signals DLj one by one; (d) a timing control section 300D for outputting the vertical scanning signals VSi, reset instruction signal KRS, sampling instruction signal SMP, clamping instruction signal CLP, and horizontal scanning signals HSj; and (d) the comparison control section 400 which outputs the counter digital signal $D_C$ with a predetermined period in which the digital value carried thereby changes and the comparative voltage signal $V_R$ whose voltage level changes over a predetermined duration.

Figure 18:
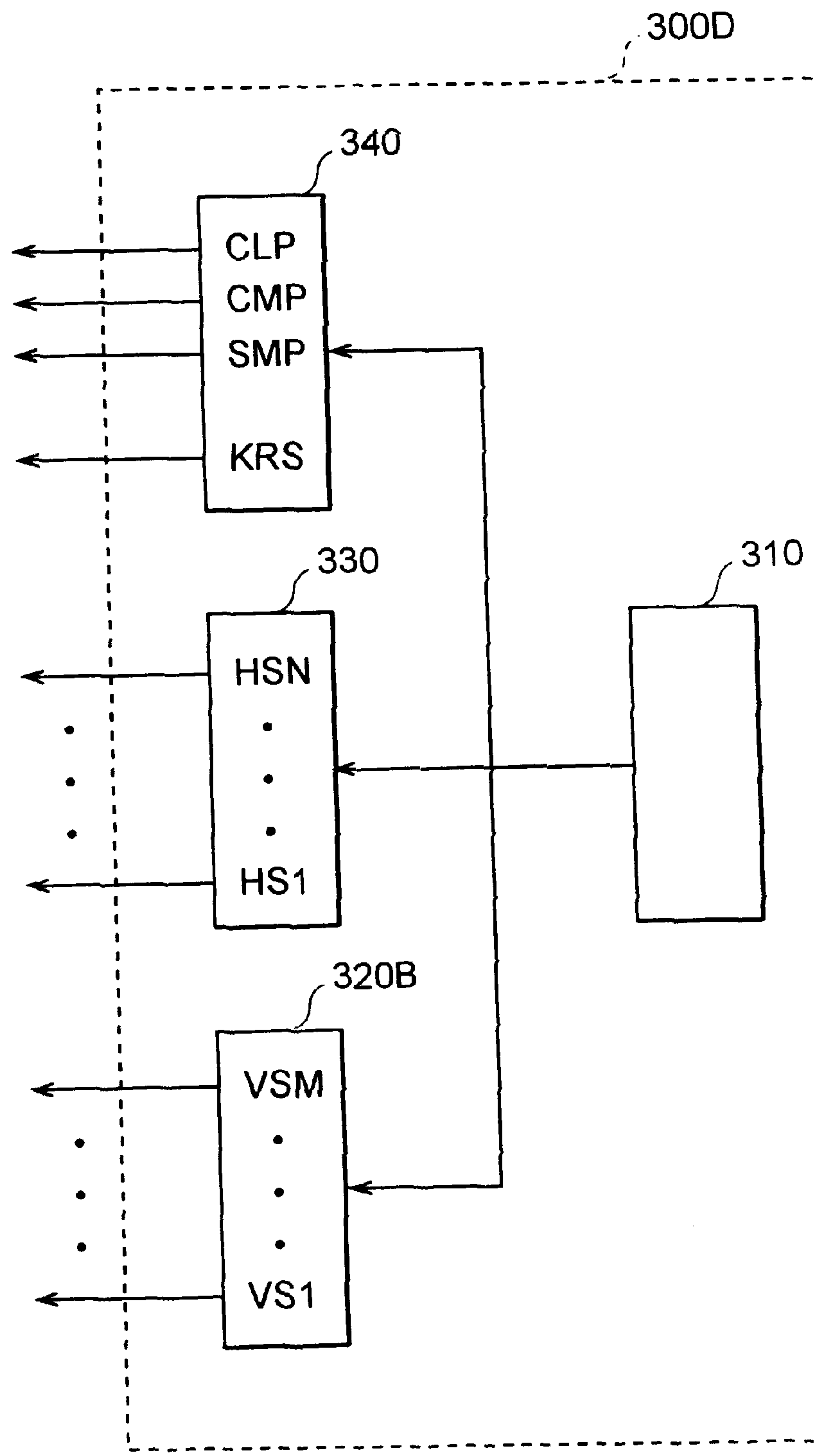
FIG. 18 is a circuit diagram of a timing control section of the solid-state imaging apparatus in accordance with Embodiment 4 of the present invention.

FIG. 18 is a circuit diagram of the timing control section 300D. As depicted, the timing control section 300D comprises (i) the basic timing generator 310 for generating a basic timing for a data readout operation; (ii) a vertical shift register 320B for outputting the vertical scanning signals VSi in synchronization with the basic timing signal outputted from the basic timing generator 310; (iii) the horizontal shift register 330 for outputting the horizontal scanning signals HSj in synchronization with the basic timing signal outputted from the basic timing generator 310; and (iv) the control signal generator 340 for generating the reset instruction signal KRS, clamping instruction signal CLP, sampling instruction signal SMP, and comparison start instruction signal CMP in response to the basic timing signal outputted from the basic timing generator 310.

Figure 19:
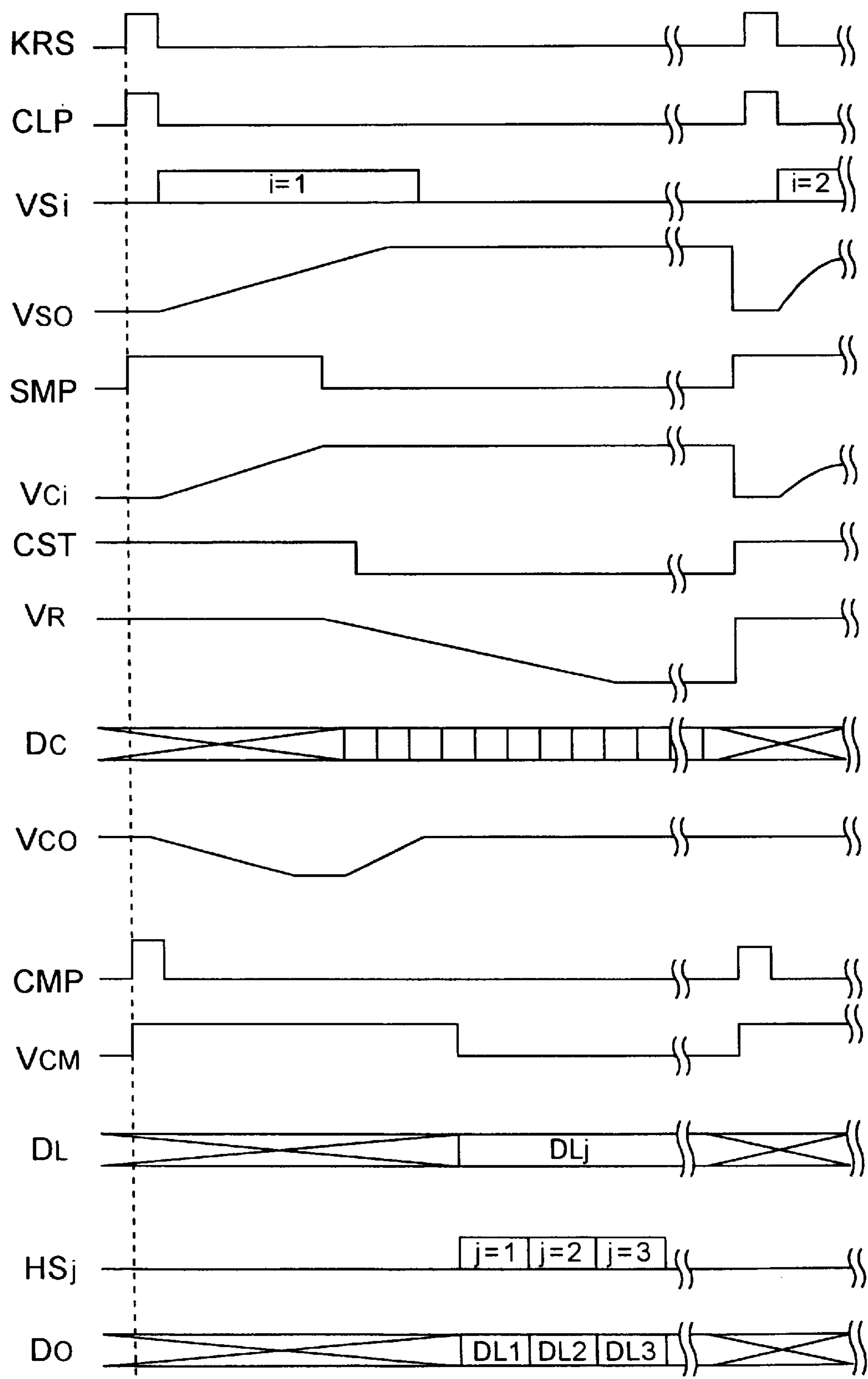
FIG. 19 is a timing chart explaining operations of the solid-state imaging apparatus in accordance with Embodiment 4 of the present invention.

As will be explained in the following, the apparatus of this embodiment collects light image data inputted into the photosensitive section 100D. FIG. 19 is a timing chart explaining operations of the apparatus in accordance with this embodiment.

In the solid-state imaging apparatus of this embodiment, the photosensitive section 100D receives a light image formed by the light incident thereon, whereby a charge corresponding to the received light intensity is accumulated in each photodiode 130 of the photosensitive section 100D. Then, after the lapse of a predetermined detecting period, digital data corresponding to the amount of charge accumulated in each photodiode 130 are read out as follows.

First, before executing a readout operation, the timing control section 300D sets the reset instruction signal KRS to its logical true level so as to set the output of the integrating circuit 220 to the reference voltage $V_{ref}$ which is its initial level, while setting the clamping instruction signal CLP to its logical true level so as to set the input/output voltage of the clamping circuit 240 to the initial level $V_{ref}$. Further, the sampling instruction signal SMP is set to its logical true level so as to turn on the switch 230. Also, the comparison control section 400 sets the comparative voltage signal to the initial comparative voltage level $V_{ref}$.

Then, the timing control section 300D sets the reset instruction signal KRS and clamping instruction signal CLP to their logical false levels, while maintaining the sampling instruction signal SMP at its logical true level. Thereafter, the timing control section 300D sets the charge readout instruction signal VS1, which turns on only the switch 140 in the first photosensitive pixel $\mathbf{120}_{1,j}$ in the vertical scanning operation of each vertical photosensitive section $\mathbf{110}_j$, to its logical true level and outputs thus set signal. When each switch 140 is turned on, the charge accumulated in the corresponding photodiode 130 due to the light received so far is outputted from the photosensitive section 100D as a current signal.

In a manner similar to that of Embodiment 1, the signal-converting circuits $\mathbf{210}_j$ which have received the current signals from their corresponding vertical photosensitive sections $\mathbf{110}_j$ output the respective digital signals DLj.

Then, according to the setting of the horizontal scanning signal HSj, a data readout operation concerning the first photosensitive pixel $\mathbf{120}_{1,j}$ in the vertical direction is started.

The timing control section 300D outputs the horizontal scanning signal HS1 which instructs only the switch $\mathbf{271}_1$ corresponding to the first photosensitive pixel $\mathbf{120}_{1,j}$ in the horizontal direction to be selected, thereby turning on only the switch $\mathbf{271}_1$ corresponding to the first photosensitive pixel $\mathbf{120}_{1,j}$.

Then, the digital signal DL1 transmitted through the switch $\mathbf{271}_1$ is outputted as an output data signal corresponding to the light intensity incident on the first photosensitive pixel $\mathbf{120}_{1,1}$ in the horizontal direction.

Subsequently, the horizontal scanning signal HS1 instructing only the switch $\mathbf{271}_1$ corresponding to the first photosensitive pixel $\mathbf{120}_{1,1}$ in the horizontal direction to be selected is canceled, whereby the data readout operation concerning the first photosensitive pixel $\mathbf{120}_{1,1}$ in the horizontal direction is terminated.

Then, as with the first photosensitive pixel $\mathbf{120}_{1,1}$ in the horizontal direction, data readout operations concerning the second and later photosensitive pixels $\mathbf{120}_{1,j}$ in the horizontal direction are executed.

Subsequently, the timing control section 300D sets the reset instruction signal KRS, clamping instruction signal CLP, and sampling instruction signal SMP to their logical true levels, while the comparison control section 400 sets the initial comparative voltage signal to the reference voltage $V_{ref}$, thereby executing data readout operations concerning the second and later photosensitive pixels $\mathbf{120}_{1,j}$ in the vertical scanning operation of each vertical photosensitive section $\mathbf{110}_j$.

As explained in detail in the foregoing, since the solid-state imaging apparatus of the present invention has an analog-to-digital converting function, while a comparative voltage signal is inputted into the input terminal of the clamping circuit, when a signal corresponding to the light intensity received by a photodiode is read out, it can accurately yield imaging data as digital data, while maintaining a high speed.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 079088/1996 filed on Apr. 1, 1996 is hereby incorporated by reference.

What is claimed is:

1. A solid-state imaging apparatus comprising:

a photosensitive pixel comprising:

a photodiode for converting an input optical signal into a current signal; and a first switch having a first terminal connected to a signal output terminal of said photodiode and a second terminal for outputting the current signal generated in said photodiode, said first switch opening and closing according to a level of a charge readout instruction signal;

a signal-converting circuit for outputting a digital signal corresponding to an amount of charge flowing therein due to said current signal received thereby, said signal-converting circuit comprising:

an integrating, circuit which selectively performs a time quadrature operation of said current signal received from said photosensitive pixel and an initializing operation for the time quadrature operation and output signal so as to output a first voltage signal which selectively corresponds to the voltage signal of a result of time quadrature of said current signal and an initial level of voltage signal with reference to time, said integrating circuit selectively executing the time quadrature operation of said current signal and the initializing operation for the time quadrature operation and output signal according to a level of a reset instruction signal received thereby;

a clamping circuit having a first input terminal for receiving said first voltage signal transmitted from said integrating circuit and a second input terminal for receiving comparative voltage signal, selectively executing a clamping operation and an operation for generating a voltage level corresponding to voltage levels of said first voltage signal and comparative voltage signal, and outputting a second voltage signal which selectively corresponds to the voltage level at the clamping operation and the voltage level corresponding to the voltage levels of said first voltage signal and comparative voltage signal with reference to time, said clamping circuit selectively executing said clamping operation and generating operation according to a level of a clamping instruction signal received;

a second switch disposed between said integrating circuit and said clamping circuit, and having a first terminal connected to an output terminal of said integrating terminal and a second terminal connected to the first input terminal of said clamping circuit, said second switch opening and closing according to a level of a sampling instruction signal;

a comparator circuit for receiving said second voltage signal outputted from said clamping circuit, comparing voltage levels of said second voltage signal and a first reference voltage in terms of magnitude, and outputting a comparison result signal corresponding to a result of comparison; and a data holding circuit for receiving a digital counter signal and said comparison result signal, holding the digital counter signal at a moment when said comparison result signal changes in a predetermined manner, and outputting thus held signal;

a timing control section for outputting said charge readout instruction signal, said reset instruction signal, said sampling instruction signal, and said clamping instruction signal; and a comparison control section for outputting said digital counter signal with a predetermined period in which a digital value carried thereby changes and said comparative voltage signal whose voltage level changes over a predetermined duration.

2. A solid-state imaging apparatus according to claim 1, wherein said integrating circuit comprises:

a differential amplifier having a negative input terminal connected to the second terminal of said first switch and a positive input terminal set to a second reference voltage;

a capacitor having a first terminal connected to the negative input terminal of said differential amplifier and a second terminal connected to an output of said differential amplifier; and a third switch which has a first terminal connected to the negative input terminal of said differential amplifier and a second terminal connected to the output of said differential amplifier, said third switch opening and closing according to the level of said reset instruction signal.

3. A solid-state imaging apparatus according to claim 1, wherein said clamping circuit comprises:

a first capacitor which has a first terminal for receiving the first voltage signal from said integrating circuit;

an amplifier having an input terminal connected to a second terminal of said first capacitor and an output terminal;

a second capacitor having a first terminal connected to the input terminal of said amplifier and a second terminal connected to the output terminal of said amplifier;

a third switch having a first terminal connected to the input terminal of said amplifier and a second terminal connected to the output terminal of said amplifier, said third switch terminal opening and closing according to the level of said reset instruction signal; and a third capacitor having a first terminal connected to the input terminal of said amplifier and a second terminal for receiving said comparative voltage signal.

4. A solid-state imaging apparatus according to claim 1, wherein the voltage level of said comparative voltage signal changes substantially linearly over time.

5. A solid-state imaging apparatus comprising:

a photosensitive section comprising a plurality of photosensitive pixels, each of said photosensitive pixels comprising:

a photodiode for converting an input optical signal into a current signal; and a first switch having a first terminal connected to a signal output terminal of said photodiode and a second terminal for outputting a current signal generated in said photodiode, wherein each of said first switches in said photosensitive section opens and closes according to a level of a corresponding charge readout instruction signal, the second terminals of said first switches being connected each other;

a signal-converting circuit for outputting a digital signal corresponding to an amount of charge flowing therein due to said current signal received thereby, said signal-converting circuit comprising:

an integrating circuit which selectively performs a time quadrature operation of said current signal received from said photosensitive pixel and an initializing operation for the time quadrature operation and output signal so as to output a first voltage signal which selectively corresponds to the voltage signal of a result of time quadrature of said current signal and an initial level of voltage signal with reference to time, said integrating circuit selectively executing the time quadrature operation of said current signal and the initializing operation for the time quadrature operation and output signal according to a level of a reset instruction signal received thereby;

a clamping circuit having a first input terminal for receiving said first voltage signal transmitted from said integrating circuit and a second input terminal for receiving a comparative voltage signal, selectively executing a clamping operation and an operation for generating a voltage level corresponding to voltage levels of said first voltage signal and comparative voltage signal, and outputting a second voltage signal which selectively corresponds to the voltage level at the clamping operation and the voltage level corresponding to the voltage levels of said first voltage signal and comparative voltage signal with reference to time, said clamping circuit selectively executing said clamping operation and generating operation according to a level of a clamping instruction signal received;

a second switch disposed between said integrating circuit and said clamping circuit, and having a first terminal connected to an output of said integrating circuit and a second terminal connected to the first terminal of said clamping circuit, said second switch opening and closing according to a level of a sampling instruction signal:

a comparator circuit for receiving said second voltage signal outputted from said clamping circuit, comparing voltage levels of said second voltage signal and a first reference voltage in terms of magnitude, and outputting a comparison result signal corresponding to a result of comparison, and a data holding circuit for receiving a digital counter signal and said comparison result signal, holding the digital counter signal at a moment when said comparison result signal changes in a predetermined manner, and outputting thus held signal;

a timing control section for outputting said charge readout instruction signals, said reset instruction signal, said sampling instruction signal, and said clamping instruction signal; and a comparison control section for outputting said digital counter signal with a predetermined period in which a digital value carried thereby changes and said comparative voltage signal whose voltage level changes over a predetermined duration.

6. A solid-state imaging apparatus according to claim 5, wherein said plurality of photosensitive pixels are aligned along a first direction.

7. A solid-state imaging apparatus according to claim 5, wherein said integrating circuit comprises:

a differential amplifier having a negative input terminal connected to the second terminal of said first switch and a positive input terminal set to a second reference voltage;

a capacitor having a first terminal connected to the negative input terminal of said differential amplifier and a second terminal connected to an output of said differential amplifier; and a third switch which has a first terminal connected to the negative input terminal of said differential amplifier and a second terminal connected to the output of said differential amplifier, said third switch opening and closing according to the level of said reset instruction signal.

8. A solid-state imaging apparatus according to claim 5, wherein said clamping circuit comprises:

a first capacitor which has a first terminal for receiving the first voltage signal from said integrating circuit;

an amplifier having an input terminal connected to a second terminal of said first capacitor and an output terminal;

a second capacitor having a first terminal connected to the input terminal of said amplifier and a second terminal connected to the output terminal of said amplifier;

a third switch which has a first terminal connected to the input terminal of said amplifier and a second terminal connected to the output terminal of said amplifier, said third switch terminal opening and closing according to the level of said reset instruction signal; and a third capacitor having a first terminal connected to the input terminal of said amplifier and a second terminal for receiving said comparative voltage signal.

9. A solid-state imaging apparatus according to claim 5, wherein the voltage level of said comparative voltage signal changes substantially linearly over time.

10. A solid-state imaging apparatus comprising:

a photosensitive section comprising a plurality of photosensitive pixels, each of said photosensitive pixels comprising:

a photodiode for converting an input optical signal into a current signal; and a first switch having a first terminal connected to a signal output terminal of said photodiode and a second terminal for outputting a current signal generated in said photodiode, said first switch opening and closing according to a level of a charge readout instruction signal;

a plurality of signal-converting circuits prepared every said photosensitive pixels, each of said signal-converting circuits outputting a digital signal corresponding to an amount of charge flowing therein due to said current signal received thereby, said signal-converting circuit comprising:

an integrating circuit which selectively performs a time quadrature operation of said current signal received from said photosensitive pixel and an initializing operation for the time quadrature operation and output signal so as to output a first voltage signal which selectively corresponds to the voltage signal of a result of time quadrature of said current signal and an initial level of voltage signal with reference to time, said integrating circuit selectively executing the time quadrature operation of said current signal and the initializing operation for the time quadrature operation and output signal according to a level of a reset instruction signal received thereby;

a clamping circuit having a first input terminal for receiving said first voltage signal transmitted from said integrating circuit and a second terminal for receiving a comparative voltage signal, selectively executing a clamping operation and an operation for gene rating a voltage level corresponding to voltage levels of said first voltage signal and comparative voltage signal, and outputting a second voltage signal which selectively corresponds to the voltage level at the clamping operation and the voltage level corresponding to the voltage levels of said first voltage signal and comparative voltage signal with reference to time, said clamping circuit selectively executing said clamping operation and generating operation according to a level of a clamping instruction signal received;

a second switch disposed between said integrating circuit and said clamping circuit, and having a first terminal connected to an output terminal of said integrating circuit and a second terminal connected to the first terminal of said clamping circuit, said second switch opening and closing according to a level of a sampling instruction signal;

a comparator circuit for receiving said second voltage signal outputted from said clamping circuit, comparing voltage levels of said second voltage signal and a first reference voltage in terms of magnitude, and outputting a comparison result signal corresponding to a result of comparison; and a data holding circuit for receiving a digital counter signal and said comparison result signal, holding the digital counter signal at a moment when said comparison result signal changes in a predetermined manner, and outputting thus hold signal;

an output-selecting circuit for receiving the digital signals outputted from all of said signal-converting processing circuits and selectively outputting one digital signal in response to an output instruction signal;

a timing control section for outputting said charge readout instruction signal, said reset instruction signal, and said sampling instruction signal, said clamping instruction signal; and a comparison control section for outputting said digital counter signal with a predetermined period in which a digital value carried thereby changes and said comparative voltage signal whose voltage level changes over a predetermined duration.

11. A solid-state imaging apparatus according to claim 10, wherein said plurality of photosensitive pixels are aligned along a first direction.

12. A solid-state imaging apparatus according to claim 10, wherein the respective first switches in said plurality of photosensitive pixels substantially simultaneously open and close in response to a common charge readout instruction signal.

13. A solid-state imaging apparatus according to claim 10, wherein said integrating circuit comprises:

a differential amplifier having a negative input terminal connected to the second terminal of said first switch and a positive input terminal set to a second reference voltage;

a capacitor having a first terminal connected to the negative input terminal of said differential amplifier and a second terminal connected to an output of said differential amplifier; and a third switch which has a first terminal connected to the negative input terminal of said differential amplifier and a second terminal connected to the output of said differential amplifier, said third switch opening and closing according to the level of said reset instruction signal.

14. A solid-state imaging apparatus according to claim 10, wherein said clamping circuit comprises:

a first capacitor which has a first terminal for receiving the first voltage signal from said integrating circuit;

an amplifier having an input terminal connected to a second terminal of said first capacitor and an output terminal;

a second capacitor having a first terminal connected to the input terminal of said amplifier and second terminal connected to the output terminal of said amplifier;

a third switch which has a first terminal connected to the input terminal of said amplifier and a second terminal connected to the output terminal of said amplifier, said third switch terminal opening and closing according to the level of said reset instruction signal; and a third capacitor having a first terminal connected to the input terminal of said amplifier and a second terminal for receiving said comparative voltage signal.

15. A solid-state imaging apparatus according to claim 10, wherein the voltage level of said comparative voltage signal changes substantially linearly over time.

16. A solid-state imaging apparatus comprising:

a photosensitive portion comprising a plurality of vertical photosensitive sections aligned in a first direction, each of said vertical photosensitive sections comprising a plurality of photosensitive pixels aligned in a second direction, each of said photosensitive pixels comprising:

a photodiode for converting an input optical signal into a current signal; and a first switch having a first terminal connected to a signal output terminal of said photodiode and a second terminal for outputting a current signal generated in said photodiode, said first switch opening and closing according to a level of a charge read out instruction signal received, wherein die first switches of the photosensitive pixels are aligned in said first direction at the same position with respect to said second direction simultaneously opening and closing in response to a common charge readout instruction signal, and the first switches of the photosensitive pixels are aligned in said second direction at the same position with respect to said first direction opening and closing respectively in response to charge readout instruction signals different from each other;

a plurality of signal-converting circuits prepared ever said vertical photosensitive sections, each of said signal-converting circuits outputting a digital signal corresponding to an amount of charge flowing therein due to said current signal received thereby, said signal-converting circuit comprising:

an integrating circuit which selectively performs a time quadrature operation of said current signal received from said vertical photosensitive section and an initializing operation for the time quadrature operation and output signal so as to output a first voltage signal which selectively corresponds to the voltage signal of a result of time quadrature of said current signal and an initial level of voltage signal with reference to time, said integrating, circuit selectively executing the time quadrature operation of said current signal and the initializing operation for the time quadrature operation and output signal according to a level of a reset instruction signal received thereby;

a clamping circuit having a first input terminal for receiving said first voltage signal transmitted from said integrating circuit and a second input terminal for receiving a comparative voltage signal, selectively executing a clamping operation and an operation for generating a voltage level corresponding to voltage levels of said first voltage signal and comparative voltage signal, and outputting a second voltage signal which selectively corresponds to the voltage level at the clamping operation and the voltage level corresponding to the voltage levels of said first voltage signal and comparative voltage signal with reference to time, said clamping circuit selectively executing said clamping operation and generating operation according to a level of a clamping instruction signal received;

a second switch disposed between said integrating circuit and said clamping circuit, and having a first terminal connected to an output terminal of said integrating circuit and a second terminal connected to the first input terminal of said clamping circuit, said second switch opening and closing according to a level of a sampling instruction signal;

a comparator circuit for receiving said second voltage signal outputted from said clamping circuit, comparing voltage levels of said second voltage signal and a first reference voltage in terms of magnitude, and outputting a comparison result signal corresponding to a result of comparison; and a data holding circuit for receiving a digital counter signal and said comparison result signal, holding the digital counter signal at a moment when said comparison result signal changes in a predetermined manner, and outputting thus held signal;

an output-selecting circuit for receiving the digital signals outputted from all of said signal-converting processing circuits and selectively outputting one digital signal in response to an output instruction signal;

a timing control section for outputting said charge readout instruction signals, said reset instruction signal, said sampling instruction signal, and said clamping instruction signal; and a comparison control section for outputting said digital counter signal with a predetermined period in which a digital value carried thereby changes and said comparative voltage signal whose voltage level changes over a predetermined duration.

17. A solid-state imaging apparatus according to claim 16, wherein said integrating circuit comprises:

a differential amplifier having a negative input terminal connected to the second terminal of said first switch and a positive input terminal set to a second reference voltage;

a capacitor having a first terminal connected to the negative input terminal of said differential amplifier and a second terminal connected to an output of said differential amplifier; and a third switch which has a first terminal connected to the negative input terminal of said differential amplifier and a second terminal connected to the output of said differential amplifier, said third switch opening and closing according to the level of said reset instruction signal.

18. A solid-state imaging apparatus according to claim 16, wherein said clamping circuit comprises:

a first capacitor which has a first terminal for receiving the first voltage signal from said integrating circuit;

an amplifier having an input terminal connected to a second terminal of said first capacitor and an output terminal;

a second capacitor having a first terminal connected to the input terminal of said amplifier and a second terminal connected to the output terminal of said amplifier;

a third switch which has a first terminal connected to the input terminal of said amplifier and a second terminal connected to the output terminal of said amplifier, said third switch terminal opening and closing according to the level of said reset instruction signal; and a third capacitor having a first terminal connected to the input terminal of said amplifier and a second terminal for receiving said comparative voltage signal.

19. A solid-state imaging apparatus according to claim 16, wherein the voltage level of said comparative voltage signal changes substantially linearly over time.

20. A solid-state imaging apparatus comprising:

a photosensitive portion having a first photosensitive section which has a first photosensitive pixel, said first photosensitive pixel comprising:

a photodiode for converting an input optical signal into a current signal;

a first switch having a first terminal connected to a signal output terminal of said photodiode and a second terminal for outputting said current signal;

a signal-converting section having a first signal-converting circuit which outputs a digital signal corresponding to an amount of charge flowing from said first photosensitive section thereinto, said first signal-converting circuit comprising:

an integrating circuit having an input terminal connected to said second terminal of said first switch so as to receive said current signal and an output terminal for outputting a first voltage signal;

a data holding circuit having a first input terminal for receiving a digital counter signal, a second input terminal for receiving a comparison result signal, and an output terminal for outputting said digital signal;

a second switch disposed between said integrating circuit and said data holding circuit, said second switch having a first terminal connected to an output terminal of said integrating terminal and a second terminal;

a clamping circuit disposed between said second switch and said data holding circuit, said clamping circuit having a first terminal for receiving a comparative voltage signal, a second input terminal connected to said second terminal of said second switch so as to receive said first voltage signal through said second switch, and an output terminal for outputting a second voltage signal;

a comparator circuit disposed between said clamping circuit and said data holding circuit, said comparator circuit having a first input terminal connected to said output terminal of said clamping circuit so as to receive said second voltage signal, a second input terminal for receiving a reference voltage signal, and an output terminal connected to said second input terminal of said data holding circuit so as to output said comparison result signal.

21. A solid-state imaging apparatus according to claim 20, wherein said first photosensitive section further comprises:

a second photosensitive pixel having the same structure as said first photosensitive pixel, said second photosensitive pixel having at least a switch corresponding to said first switch in said first photosensitive pixel, said switch in said second photosensitive pixel having a terminal corresponding to said second terminal of said first switch in said first photosensitive pixel, wherein second terminal of said first switch in said first photosensitive pixel and said terminal of said switch in said second photosensitive pixel are respectively connected to said input terminal of said integrating circuit in said first signal-converting circuit.

22. A solid-state imaging apparatus according to claim 20, wherein said photosensitive portion further comprises a second photosensitive section having a third photosensitive pixel which has the same structure as said first photosensitive pixel, said third photosensitive pixel having at least a switch corresponding to said first switch in said first photosensitive pixel, said switch of said third photosensitive pixel having a terminal corresponding to said second terminal of said first switch in said first photosensitive pixel, wherein said signal-converting section further comprises a second signal-converting circuit provided for said second photosensitive section and having the same structure as said first signal-converting circuit, said second signal-converting circuit having at least an integrating circuit corresponding to said integrating circuit in said first signal-converting circuit, said integrating circuit in said second signal-converting circuit having a terminal corresponding to said input terminal of said integrating circuit in said first signal-converging circuit and connected to said terminal of said switch in said second photosensitive pixel.

23. A solid-state imaging apparatus according to claim 22, wherein each of said first and second photosensitive sections further comprises a fourth photosensitive pixel having the same structure as said first photosensitive pixel, said fourth photosensitive pixel having a switch corresponding to said first switch in said first photosensitive pixel, said switch in said fourth photosensitive pixel having a terminal corresponding to said second terminal of said first switch in said first photosensitive pixel, and wherein said terminal of said switch in said fourth photosensitive pixel is connected to the associated one of said input terminal of said integrating circuit in said first signal-converting circuit and said terminal of said integrating circuit in said second signal-converging circuit.

* * * * *